(12) United States Patent
Kikuchi et al.

(10) Patent No.: US 7,120,125 B2
(45) Date of Patent: Oct. 10, 2006

(54) COMMUNICATION CAPABILITY MEASURING EQUIPMENT

(75) Inventors: Shinji Kikuchi, Kawasaki (JP);
Motomitsu Adachi, Kawasaki (JP);
Yasuhiro Kokusho, Kawasaki (JP);
Yoshiharu Sato, Fukuoka (JP);
Katsuichi Nakamura, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 802 days.

(21) Appl. No.: 10/025,861

(22) Filed: Dec. 26, 2001

(65) Prior Publication Data

US 2003/0031185 A1    Feb. 13, 2003

(30) Foreign Application Priority Data

Jun. 19, 2001  (JP) ............................ 2001-185348

(51) Int. Cl.
*G01R 31/08* (2006.01)

(52) U.S. Cl. ................................................... 370/252

(58) Field of Classification Search .................... None
See application file for complete search history.

(56) References Cited

U.S. PATENT DOCUMENTS

| | | | |
|---|---|---|---|
| 5,477,542 A * | 12/1995 | Takahara et al. ............. | 370/389 |
| 5,913,041 A * | 6/1999 | Ramanathan et al. ....... | 709/233 |
| 6,430,160 B1 * | 8/2002 | Smith et al. ................. | 370/252 |
| 2002/0080726 A1 * | 6/2002 | Klassen et al. ............. | 370/252 |

* cited by examiner

*Primary Examiner*—Chau Nguyen
*Assistant Examiner*—Cynthia L. Davis
(74) *Attorney, Agent, or Firm*—Staas & Halsey LLP

(57) ABSTRACT

Every time a packet is received from a server, a communication performance measuring equipment transmits/receives a predetermined control packet to/from a client and a branching node, respectively, thereby collecting information about communication environment. Based on the information and a predetermined delay model, a delay time in delivering the same packet from the server to the client is estimated, and, according to the delay time, transmission timing of an acknowledge packet in response to the received packet is controlled. Thus, it is possible to accurately measure communication performance between an arbitrary client and an arbitrary server, no matter where the communication performance measuring equipment is physically arranged.

8 Claims, 21 Drawing Sheets

COMMUNICATION CAPABILITY MEASURING EQUIPMENT

BACKGROUND OF THE INVENTION

1. Field of the Invention

The present invention relates to a communication performance measuring equipment for measuring network performance in communication using a TCP/IP protocol.

As personal computers and cellular phones connectable to the Internet become widespread recently, various providers have come to provide various services via the Internet to general users. Meanwhile, the general users' demands for not only receiving the various services, but also enjoying the services more comfortably are increasing.

In order to meet the demands of the users, it is necessary to create an environment which enables the users to receive the services comfortably. Further, in order to determine whether or not the expansion of facilities is needed for the purpose of creation of the environment, it is necessary to precisely understand the present environment through which the users receive the services, that is, communication performance which is represented by, for example, the time required for file transfer or the like using the TCP/IP protocol in the actual network as a medium of providing the services.

2. Description of the Related Art

In order to measure the network performance of the communication using the TCP/IP protocol, either one of the following two methods is conventionally adopted.

FIG. 21(a) shows a first structural example of a conventional communication performance measuring system, and FIG. 21(b) shows a second structural example of the conventional communication performance measuring system.

In FIGS. 21, a client 401 is connected to an access point 403 through a router $402_{cl}$, and establishes connections to a server 404a and a server 404b through a router $402_{a1}$ to a router $402_{ak}$ or through a router $402_{bl}$ to a router $402_{bl}$, respectively, to receive the services from the server 404a or the server 404b.

Therefore, as shown in FIG. 21(a), a performance measuring equipment 410 having a communication environment equivalent to that of the client 401 is connected to the access point 403, and the performance measuring equipment 410 measures the time required to establish the connection to the server 404a or 404b and the time required to download a file from the server 404a or 404b, so that the quality of service, which is provided for a user of the client 401, can be evaluated accurately.

Meanwhile, as shown in FIG. 21(b), it is also possible to adopt the structure in which another performance measuring equipment 420 is connected to the router $402_{ak}$ to which the server 404a is directly connected, and the performance measuring equipment 420 records traffic flowing into the server 404a and traffic transmitting from the server 404a, respectively. When the structure is adopted, it is possible to evaluate the network performance on the server's side, by analyzing the information recorded by the performance measuring equipment 420.

It should be mentioned that, in the conventional art as shown in FIG. 21, the performance measuring equipment is placed at positions physically close to the client or the server to actually measure the communication performance of the network on the client's side and of the network on the server's side.

Meanwhile, the number of the users of the network, or the clients has been rapidly increasing, and their communication environments are widely various. The servers for providing services has been rapidly increasing as well. Enormous amounts of time, labor and costs are therefore necessary to actually measure the communication performance of each client or server by the conventional methods as described above. The reason is that, when the conventional methods are simply applied, it is necessary to place the performance measuring equipment physically close to each of the enormous number of the clients or servers for the purpose of performance evaluation.

SUMMARY OF THE INVENTION

It is an object of the present invention to provide a communication performance measuring equipment capable of measuring communication quality between an arbitrary client and an arbitrary server which are connected to a network, irrespective of physical location of the communication performance measuring equipment.

It is another object of the present invention to provide techniques of simulating data delivery based on delay models of routers which exist between the server and the client, and of accurately evaluating the communication performance on paths between the server and the client.

It is still another object of the present invention to provide a technique of precisely simulating data transfer between the server and the client, upon reflecting communication conditions of the network at the time of sending/receiving each packet between the server and the client.

It is yet another object of the present invention to reduce workload of an operator of the communication performance measuring equipment by allowing a part of a parameter representing measuring conditions to be omitted.

It is still another object of the present invention to provide a technique of precisely simulating data communication by a sophisticated protocol such as HTTP.

It is yet another object of the present invention to provide a technique of simulating data transmission between the client and the server with packet discarding of the client taken into consideration.

It is still another object of the present invention to provide a technique of flexibly measuring communication performance, in accordance with anticipated various situations in which users recognize the performance.

The above objects are achieved by a communication performance measuring equipment which comprises: a communicating unit for communicating via the network based on TCP/IP; an input unit for receiving a parameter representing a communication environment to be measured; a communication controlling unit for controlling communicating operation of the communicating unit, the operation being performed for acquiring a predetermined file from the server; a packet sending/receiving unit for sending/receiving a predetermined control packet to/from a destination specified by a transmission instruction; a situation inspecting unit for collecting information about sending/receiving conditions of the predetermined control packet sent/received by the packet sending/receiving unit, a primary transmission instructing unit for inputting, to the packet sending/receiving unit, the transmission instruction of specifying appropriate destinations in response to reception of the packet in the communicating unit; a delay estimating unit for estimating a delay time in delivering the packet from the server to the client, based on the information collected by the situation inspecting unit and a predetermined delay model; a reply controlling unit for adjusting transmission timing of an acknowledge packet in response to reception of the packet, according to the estimated delay time; and a performance estimating unit for estimating communication performance on a communication path between the client and the server, in accordance with a progress in the communication of the communicating unit.

In the communication performance measuring equipment, it is possible to simulate the communication between the server and the client by estimating a delay time in delivering the packet between the server and the client and adjusting the transmission timing of the acknowledge packets according to the delay time in response to each received packet, which enables the performance estimating unit to collect information about the communication performance. This makes it possible to estimate the communication performance on the path between the client and the server, irrespective of the physical position of the communication performance measuring equipment.

The above objects are achieved by a second communication performance measuring equipment, wherein the situation inspecting unit in the aforementioned communication performance measuring equipment further comprises: a transmission detecting unit for recording, for each destination, a time instant at which the predetermined control packet is transmitted by the packet sending/receiving unit; a reception detecting unit for recording, for each destination, a time instant at which a response to the predetermined control packet is received; and a time informing unit for informing the delay estimating unit of the transmission time and the reception time recorded for each destination, and wherein the delay estimating unit further comprises; a round-trip time calculating unit for calculating, based on the transmission time and the reception time informed by the time informing unit, a first round trip time required for the predetermined control packet to reciprocate between the client and the equipment, and a second round trip time required for the same to reciprocate between the branching node and the equipment; and a difference estimating unit for estimating, based on the first round trip time, the second round trip time, and the delay model, a difference between a time required to deliver the data packet or the control packet received by the communicating unit from the server to the equipment, and a time required to deliver the same from the server to the client.

According to the second communication performance measuring equipment, the difference between the time required to deliver the packet to the client and the time required to deliver the same to the communication performance measuring equipment can be estimated with the size of the received packet taken into consideration so that the acknowledge packet can be returned to the server from the client at a timing at which the client is supposed to return the acknowledge packet.

The above objects are achieved by a third communication performance measuring equipment, wherein the input unit in the communication performance measuring equipment with the basic structure further comprises: a path information collecting unit for collecting first path information representing nodes existing on the path from the equipment to the client, and second path information representing nodes exiting on the path from the equipment to the server; and a branch detecting unit for comparing the first path information with the second path information to detect the identifier of the branching node.

According to the third communication performance measuring equipment, it is also possible to automatically know a positional relation of the communication performance measuring equipment, the server, and the client in the network, whereby allows omission of a part of the necessary operations of an operator of the communication performance measuring equipment such as collecting information representing the positional relation of the same and inputting the information, and further allows reduction in operational workload.

The above objects are achieved by a fourth communication performance measuring equipment, wherein the input unit in the communication performance measuring equipment with the basic structure further comprises: a secondary transmission instructing unit for instructing the packet sending/receiving unit to transmit, to the client, two control packets having different data lengths from each other; a round-trip time measuring unit for measuring round trip time of each of the two control packets; and a coefficient estimating unit for estimating an appropriate coefficient value in the predetermined delay model based on the obtained round trip time of each of the two control packets, and for inputting the resultant as a part of the parameter.

According to the fourth communication performance measuring equipment, it is possible to estimate a coefficient relating to a factor which varies with the size of the transmitted packet in the delay model so that the input of the coefficient can be omitted.

The above objects are achieved by a fifth communication performance measuring equipment, wherein the delay estimating unit in the second communication performance measuring equipment further comprises: an offset calculating unit for calculating, based on a predetermined model, a factor of a delay occurring due to accumulation of the data packets which are transmitted from the server to the client in a burst mode; and a difference output unit for adding the calculated offset to the estimated value obtained by the difference estimating unit, and for outputting the resultant as an estimated value.

According to the fifth communication performance measuring equipment, the delay time can be accurately estimated including the factor which occurs due to the accumulation of the data packets transmitted in the burst mode on the client's side.

The above objects are achieved by a sixth performance measuring equipment, wherein the delay estimating unit in the fifth communication performance measuring equipment further comprises a stop decision unit for comparing the calculated offset with a predetermined threshold, and for instructing the reply controlling unit to stop the transmission of the acknowledge packet, according to the comparison result.

According to the sixth communication performance measuring equipment, detecting the state in which packets overflow from the finite queue provided in the client makes it possible to simulate the responding operations of the client.

The above objects are achieved by a seventh communication performance measuring equipment, wherein the performance estimating unit in the communication performance measuring equipment with the basic structure further comprises: a first recording unit for recording start time and finish time of each of procedures defined in HTTP; and a duration calculating unit for calculating a duration for each procedure and the sum of the durations of the procedures based on the recorded start time and the finish time.

According to the seventh communication performance measuring equipment, the lengths of times such as times required to establish the connection and to acquire a file or a plurality of files at once can be measured by integrating a duration of each of various procedures performed according to HTTP.

The above objects are achieved by an eighth communication performance measuring equipment, wherein the performance estimating unit in the communication performance measuring equipment with the basic structure further comprises: a second recording unit for recording start time and finish time of each of procedures defined in FTP; and a duration calculating unit for calculating a duration for each procedure and the sum of the durations of the procedures.

According to the eighth communication performance measuring equipment, the lengths of times such as times required to establish the connection and to acquire a file or a plurality of files at once can be measured by integrating a duration of each of various procedures performed according to FTP.

BRIEF DESCRIPTION OF THE DRAWINGS

The nature, principle, and utility of the invention will become more apparent from the following detailed description when read in conjunction with the accompanying drawings in which like parts are designated by identical reference numbers, in which.

DESCRIPTION OF THE PREFERRED EMBODIMENTS

[Principle]

First, the principle of a communication performance measuring equipment according to the present invention will be explained.

Figure 1:
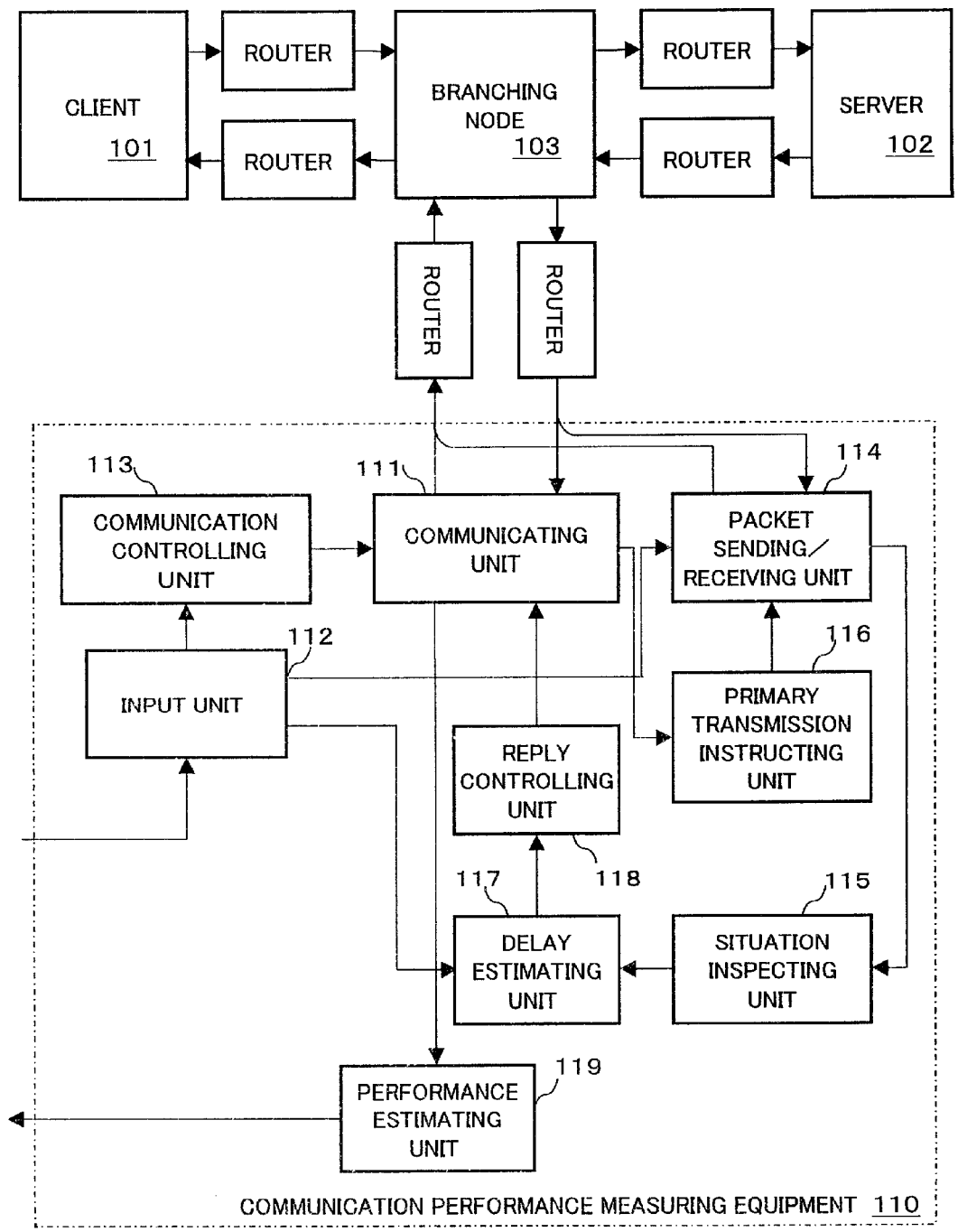
FIG. 1 is a block diagram showing the principle of a communication performance measuring equipment according to the present invention.

FIG. 1 shows the principle of a first communication performance measuring equipment according to the present invention.

The first communication performance measuring equipment shown in FIG. 1 is structured of a communicating unit 111, an input unit 112, a communication controlling unit 113, a packet sending/receiving unit 114, a situation inspecting unit 115, a primary transmission instructing unit 116, a delay estimating unit 117, a reply controlling unit 118 and a performance estimating unit 119.

The principle of the first communication performance measuring equipment according to the present invention is as follows.

The communicating unit 111 communicates based on TCP/IP. The input unit 112 receives at least a server identifier and a client identifier as a parameter. The communication controlling unit 113 controls communicating operation of the communicating unit 111 which is performed for acquiring a predetermined file from a server 102, following a predetermined procedure. The packet sending/receiving unit 114 sends/receives a predetermined control packet to/from a destination which is identified by an identifier specified by a transmission instruction. The situation inspecting unit 115 collects information about sending/receiving conditions of the predetermined control packet which is transmitted to each destination and a predetermined control packet which is returned from each destination in response to aforesaid control packet. The primary transmission instructing unit 116 inputs the transmission instruction which specifies a client 101 and a branching node 103 as destinations, to the packet sending/receiving unit 114, according to receiving conditions of the packet in the communicating unit 111. Based on the collected information about the sending/receiving conditions of the predetermined control packet and a predetermined delay model, the delay estimating unit 117 estimates a delay time in delivering a data packet from the server 102 to the client 101. According to the estimated delay time, the reply controlling unit 118 adjusts a time at which the communicating unit 111 transmits an acknowledge packet in response to reception of the data packet or the control packet. The performance estimating unit 119 collects information about a progress in the communication of the communicating unit 111, and estimates, based on the collected information, communication performance of a communication path between the specified client 101 and server 102.

The operation of the first communication performance measuring equipment is as follows.

The communication controlling unit 113 controls the communicating operation of the communicating unit 111 based on the parameter inputted by the input unit 112, to acquire a predetermined file from the server 102. At this point, the packet sending/receiving unit 114 sends/receives the predetermined control packet to/from the client 101 and the branching node 103 according to the instruction from the primary transmission instructing unit 116, while the situation inspecting unit 115 collects information about communication environments on the paths between the branching node 103 and the communication performance measuring equipment 110 and between the client 101 and the communication performance measuring equipment 110, respectively, at a time instant at which an actual packet is transmitted from the server 102. Based on the collected information and the predetermined delay model, the delay estimating unit 117 estimates the delay time in delivering the packet between the server 102 and the client 101, and the reply control unit 118 adjusts, according to this delay time, the timing at which the communicating unit 111 transmits the acknowledge packet in response to the received packet.

Figure 2:
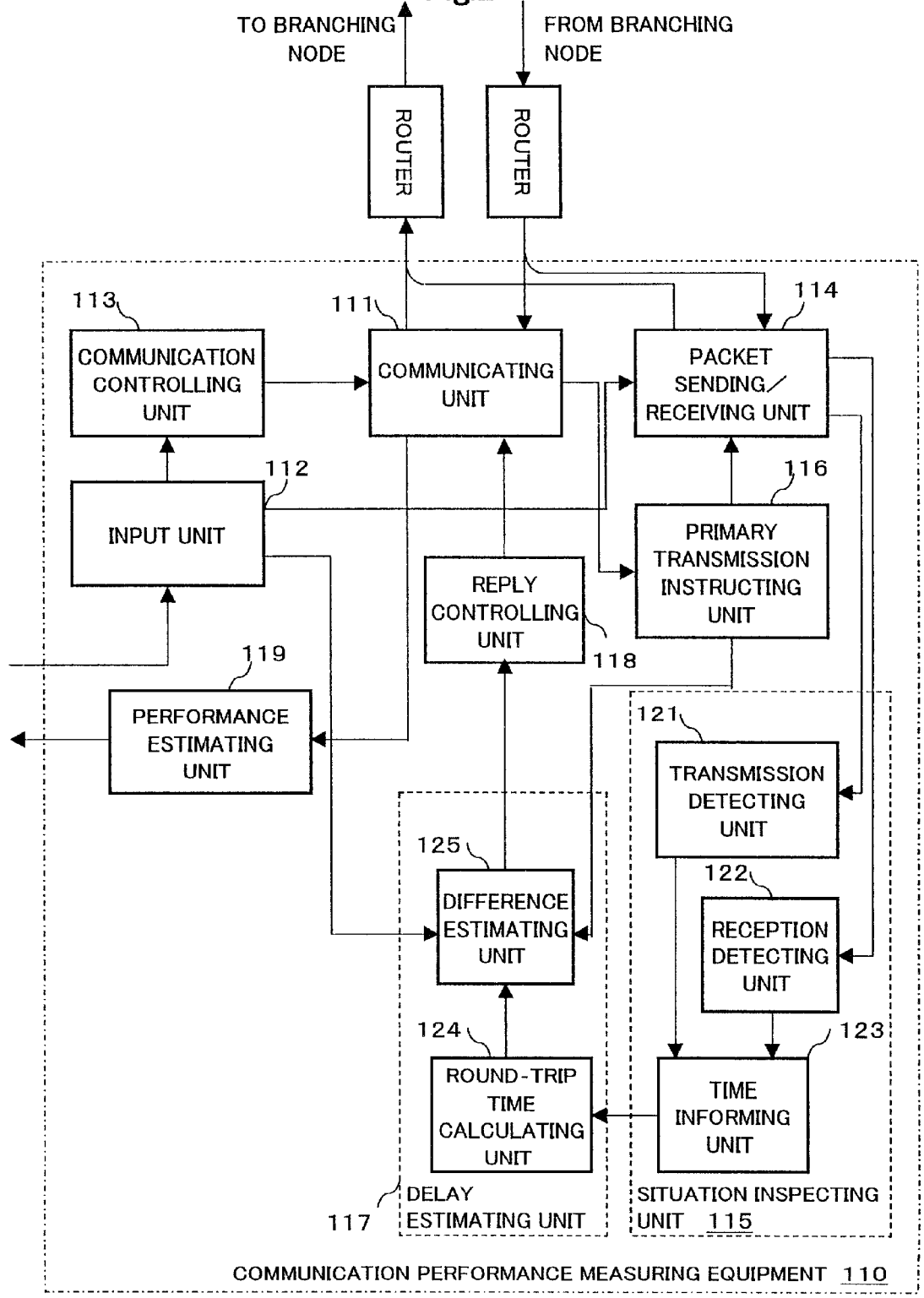
FIG. 2 is a block diagram showing the principle of the communication performance measuring equipment according to the present invention.

FIG. 2 is a principle block diagram showing a second communication performance measuring equipment according to the present invention.

In the second communication performance measuring equipment shown in FIG. 2, the situation inspecting unit 115 includes a transmission detecting unit 121, a reception detecting unit 122 and a time informing unit 123, and further, the delay estimating unit 117 includes a round-trip time calculating unit 124 and a difference estimating unit 125.

The principle of the second communication performance measuring equipment according to the present invention is as follows.

In the situation inspecting unit 115 provided in the communication performance measuring equipment, the transmission detecting unit 121 records a time at which the packet sending/receiving unit 114 transmits the predetermined control packet to each destination. The reception detecting unit 122 records a time at which the packet sending/receiving unit 114 receives the acknowledge packet which is returned from the destination. The time informing unit 123 informs the delay estimating unit 117 of the transmission time and the reception time corresponding to each destination. Based on the informed transmission time and reception time, the round-trip time calculating unit 124 in the delay estimating unit 117 calculates a first round trip time which is necessary for the packet to make a round trip between the client 101 and the communication performance measuring equipment 110 and a second round trip time which is necessary for the packet to make a round trip between the branching node 103 and the communication performance measuring equipment 110. Based on the first round trip time, the second round trip time, and the delay model, the difference estimating unit 125 estimates a difference between the time necessary deliver the packet received by the communicating unit 111 from the server 102 to the communication performance measuring equipment 110 and the time necessary to deliver the same from the server 102 to the client 101.

The operation of thus-structured second communication performance measuring equipment is as follows.

The transmission detecting unit 121 and the reception detecting unit 122 which are provided in the situation inspecting unit 115 record times at which the packet sending/receiving unit 114 sends/receives the predetermined control packet, and the time informing unit 123 informs the delay estimating unit 117 of the times. Based on the recorded times, the round-trip time calculating unit 124 calculates the first round trip time and the second round trip time. The difference estimating unit 125 assigns the times to the delay models of the respective paths, thereby erasing unknowns from expressions representing the delay times of the paths, and estimating the difference between the time necessary for delivering the packet to the client 101 and the time necessary for delivering the same to the communication performance measuring equipment 110. Then, the estimated difference is supplied to the reply controlling unit 118 so that transmitting operation of the acknowledge packet by the communicating unit 111 is delayed by a time corresponding to the size of the packet which is received by the communicating unit 111.

Figure 3:
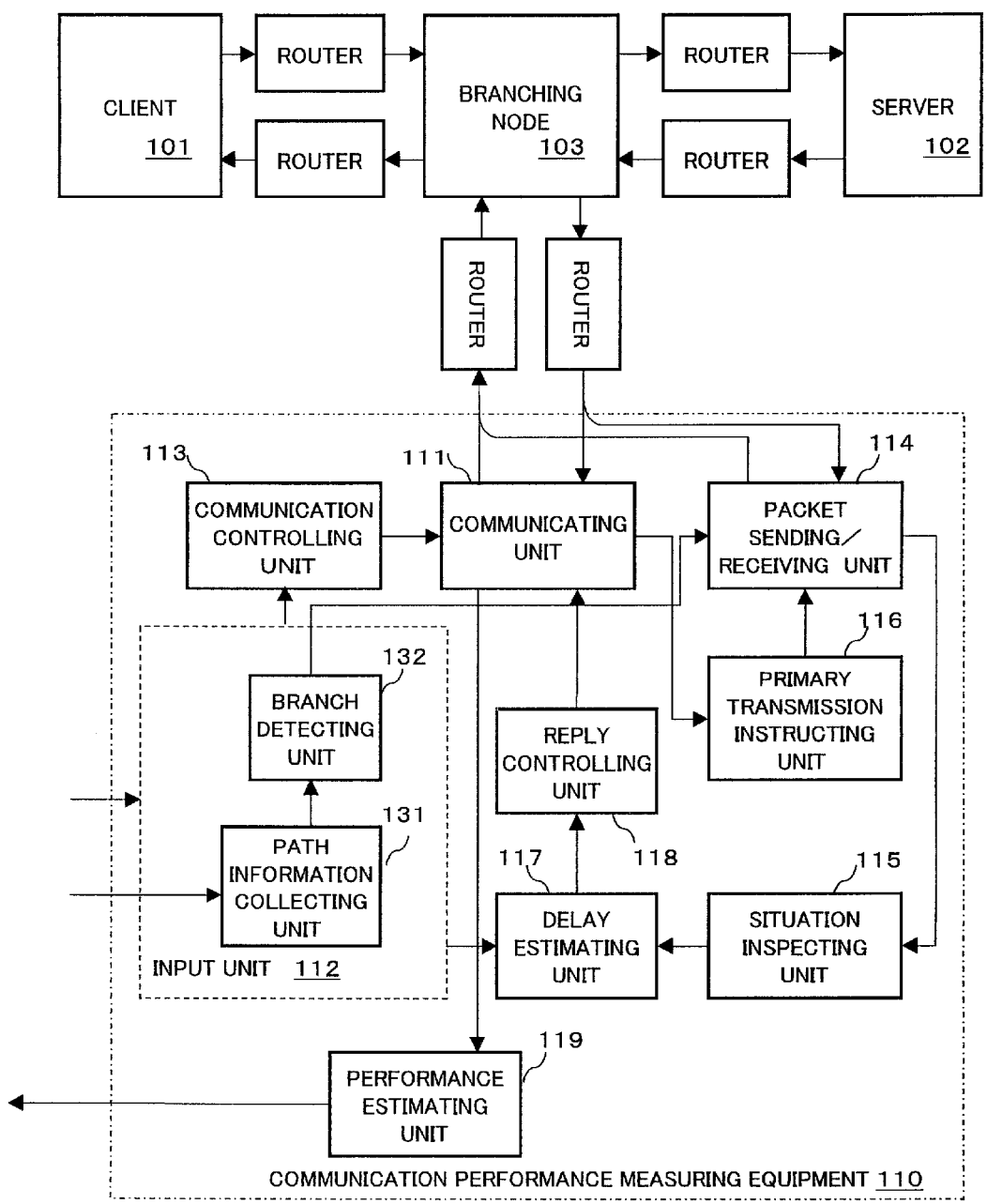
FIG. 3 shows a first structure of an input unit which is provided in the communication performance measuring equipment according to the present invention.

FIG. 3 shows the structure of an input unit which is provided in a third communication performance measuring equipment according to the present invention.

In the third communication performance measuring equipment shown in FIG. 3, the input unit 112 is structured of a path information collecting unit 131 and a branch detecting unit 132.

The principle of the third communication performance measuring equipment according to the present invention is as follows.

In the input unit 112 provided in the first communication performance measuring equipment, the path information collecting unit 131 collects first path information which consists of identifiers for identifying respective nodes being placed on the paths from the equipment to the client 101, and second path information which consists of identifiers for identifying respective nodes being placed on the paths from the equipment to the server 102. The branch detecting unit 132 compares the first path information with the second path information to detect the identifier for identifying the branching node 103, and inputs this identifier as a part of the parameter.

The operation of thus-structured third communication performance measuring equipment is as follows.

The path information collecting unit 131 provided in the input unit 112 collects the first path information and the second path information, and the branch detecting unit 132 compares both information, whereby the identifier of the branching node 103 is automatically detected.

Figure 4:
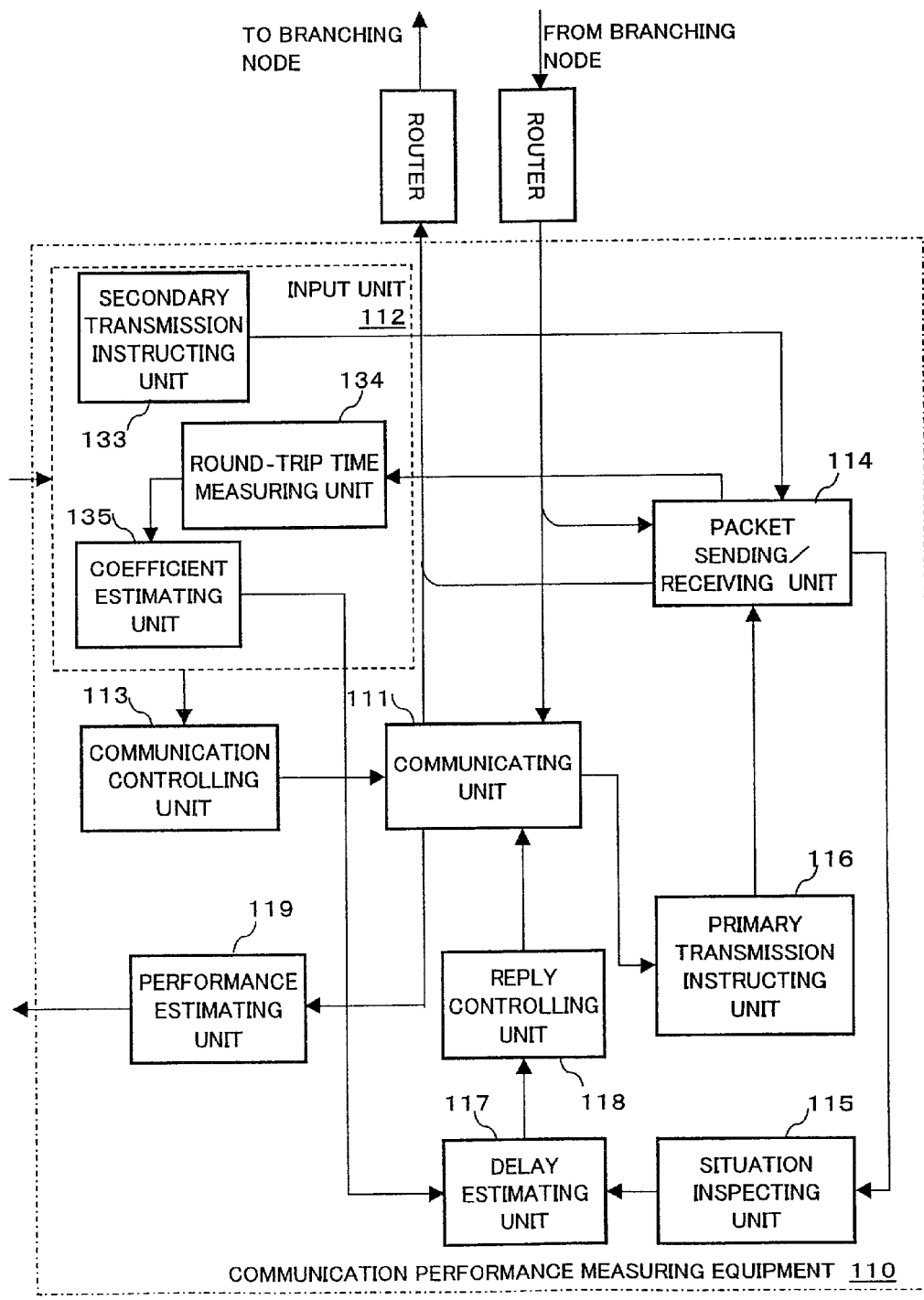
FIG. 4 shows a second structure of the input unit which is provided in the communication performance measuring equipment according to the present invention.

FIG. 4 shows the structure of an input unit which is provided in a fourth communication performance measuring equipment according to the present invention.

In the fourth communication performance measuring equipment shown in FIG. 4, the input unit 112 is structured of a secondary transmission instructing unit 133, a round-trip time measuring unit 134 and a coefficient estimating unit 135.

The principle of the fourth communication performance measuring equipment according to the present invention is as follows.

In the input unit 112 provided in the first communication performance measuring equipment, the secondary transmission instructing unit 133 instructs the packet sending/receiving unit 114 to transmit two control packets whose data lengths are different from each other to the client 101. The round-trip time measuring unit 134 measures round trip times of each of the two control packets. Based on the round trip times of the two control packets, the coefficient estimating unit 135 estimates a coefficient relating to a factor which varies according to the size of the transmitted packet, in the predetermined delay model signifying data transmission between the branching node 103 and the client 101, and inputs it as a part of the parameter.

The operation of thus-structured fourth communication performance measuring equipment is as follows.

When the packet sending/receiving unit 114 sends/receives the two control packets having different data lengths from each other to/from the client 101, according to the instruction from the secondary transmission instructing unit 133, the round-trip time measuring unit 134 measures the round trip times of the two control packets. The coefficient estimating unit 135 assigns the round trip times to the delay model between the branching node 103 and the client 101, whereby a coefficient in the delay model, the coefficient relating to a factor which varies according to the size of the transmitted packet, is estimated.

Figure 5:
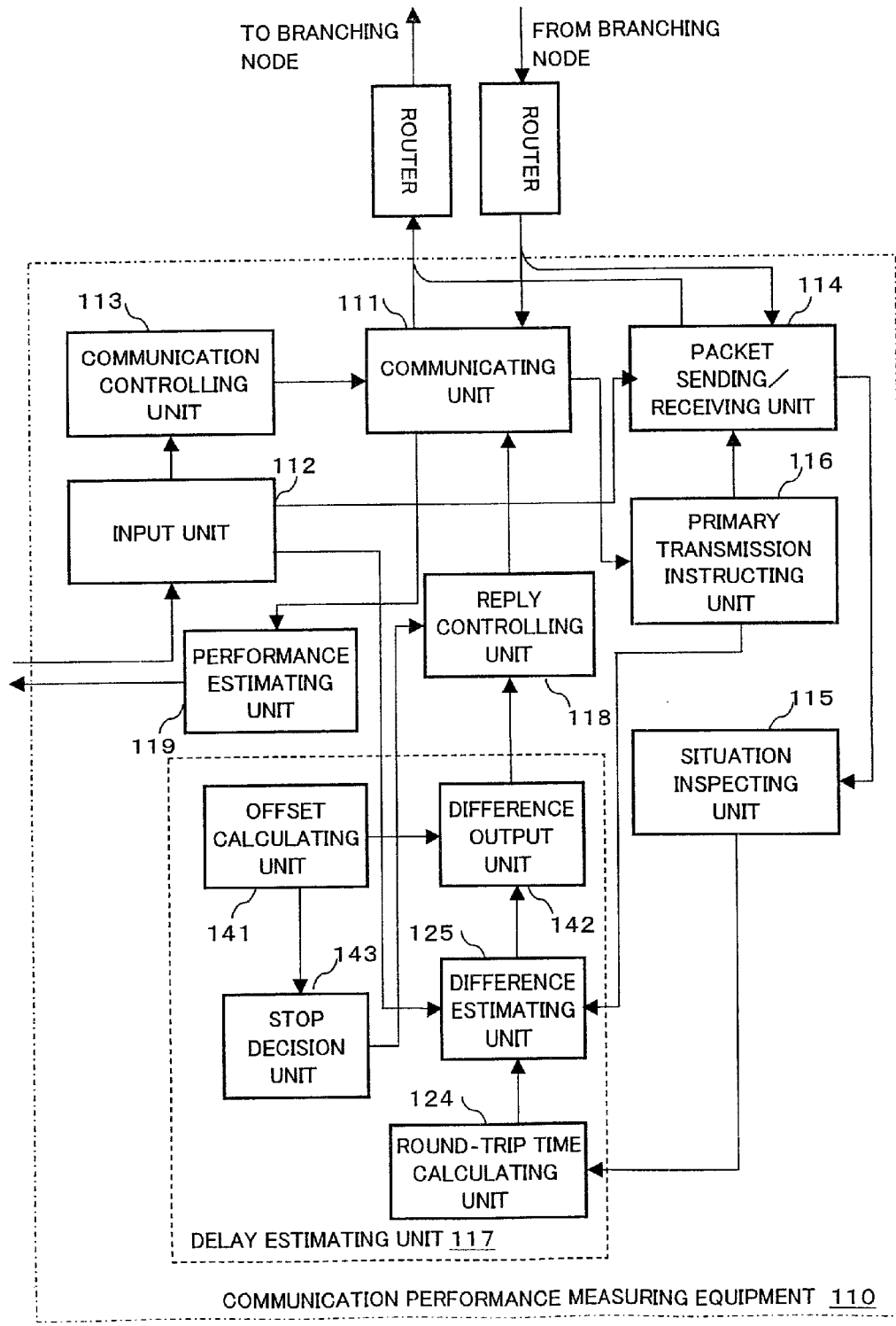
FIG. 5 shows the structure of a delay estimating unit which is provided in the communication performance measuring equipment according to the present invention.

FIG. 5 shows the structure of a delay estimating unit which is provided in fifth and sixth communication performance measuring equipment according to the present invention.

In the fifth communication performance measuring equipment shown in FIG. 5, the delay estimating unit 117 is structured of an offset calculating unit 141 and a difference output unit 142.

The principle of the fifth communication performance measuring equipment according to the present invention is as follows.

In the delay estimating unit 117 which is provided in the second communication performance measuring equipment shown in FIG. 2, the offset calculating unit 141 calculates, based on a predetermined model, a factor of the delay time which occurs due to accumulation of the data packets transmitted in a burst mode and outputs an offset corresponding to the factor. The difference output unit 142 adds the above offset to the estimated value which is obtained by the difference estimating unit 125, and outputs the resultant as an estimated value.

The operation of thus-structured fifth communication performance measuring equipment is as follows.

The difference output unit 142 adds the calculated offset to the obtained difference, whereby the difference obtained by the difference estimating unit 125 is offset to an accurate value including the factor which occurs because of the accumulation of the data packets transmitted in the burst mode.

Moreover, in the sixth communication performance measuring equipment shown in FIG. 5, the delay estimating unit 117 includes a stop decision unit 143.

The principle of the sixth communication performance measuring equipment according to the present invention is as follows.

In the delay estimating unit 117 which is provided in the sixth communication performance measuring equipment shown in FIG. 5, the stop decision unit 143 compares the offset calculated by the offset calculating unit 141 with a predetermined threshold, and instructs, according to the comparison result, the reply controlling unit 118 to stop the transmission of the acknowledge packet.

The operation of thus-structured sixth communication performance measuring equipment is as follows.

When, for example, the offset exceeds the predetermined threshold, the stop decision unit 143 instructs the reply controlling unit 118 to stop the transmission of the acknowledge packet, the reply controlling unit 118 allows the communicating unit 111 to stop the transmission of the acknowledge packet by.

Figure 6:
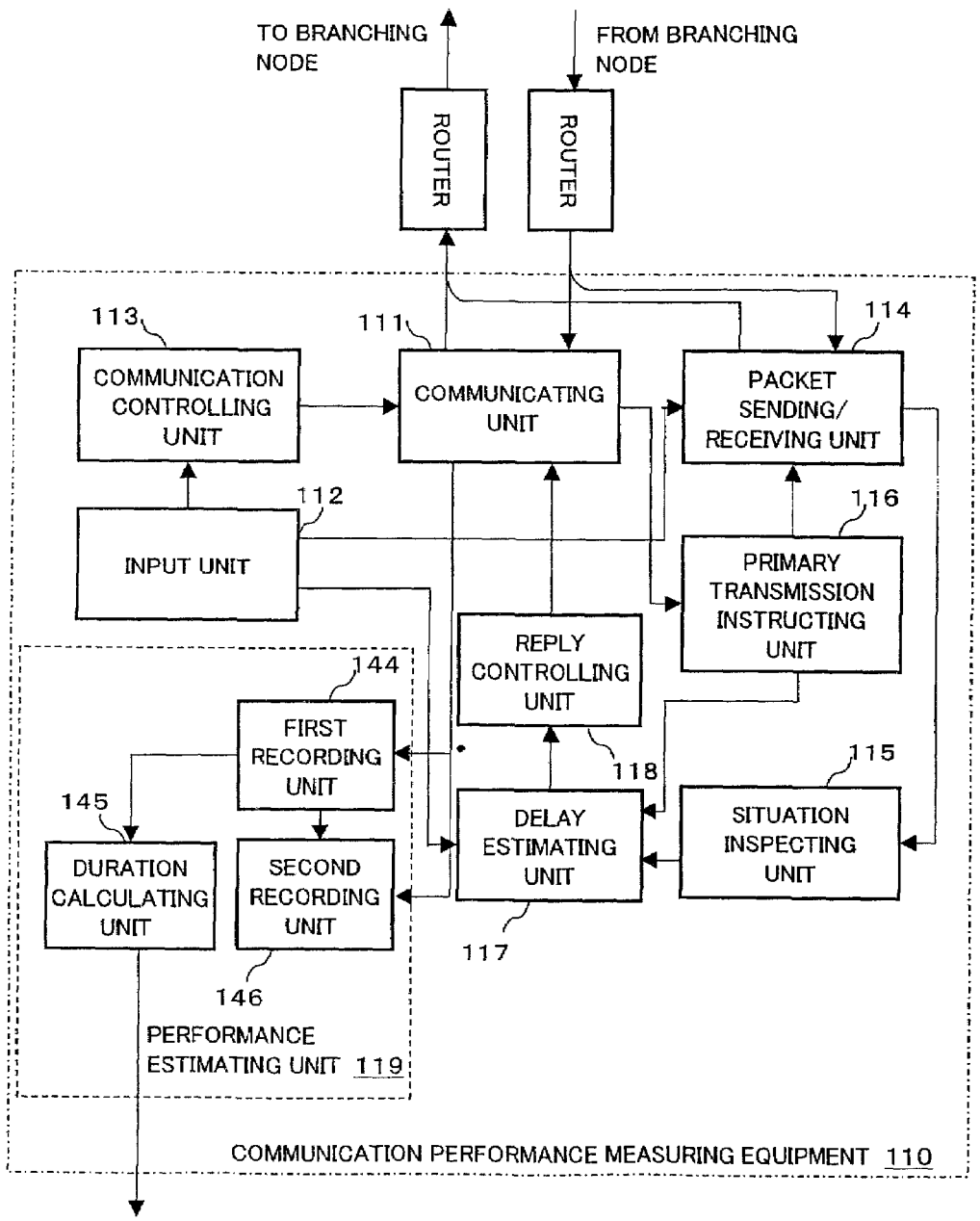
FIG. 6 shows the structure of a performance estimating unit which is provided in the communication performance measuring equipment according to the present invention.

FIG. 6 shows the structure of a performance estimating unit provided in seventh and eighth communication performance measuring equipment according to the present invention.

In the seventh communication performance measuring equipment shown in FIG. 6, the performance estimating unit 119 is structured of a first recording unit 144 and a duration calculating unit 145.

The principle of the seventh communication performance measuring equipment according to the present invention is as follows.

In the performance estimating unit 119 which is provided in the first communication performance measuring equipment, the first recording unit 144 monitors sending/receiving operation of the control packet and the data packet made by the communicating unit 111, and records a start time and a finish time for each of procedures which are defined by HTTP. The duration calculating unit 145 calculates a difference between the start time and the finish time recorded for each procedure, as a duration.

The operation of thus-structured seventh communication performance measuring equipment is as follows.

The first recording unit 144 records the start times and the finish times of the respective procedures which are defined by the HTTP, and the duration calculating unit 145 calculates based on both of the recorded times, durations required for performing various procedures, such as a time required to establish connection and a time required to acquire each file or a plurality of files at once.

Furthermore, in the eighth communication performance measuring equipment shown in FIG. 6, the performance estimating unit 119 is structured of a second recording unit 146 and the duration calculating unit 145.

The principle of the eighth communication performance measuring equipment according to the present invention is as follows.

In the performance estimating unit 119 which is provided in the first communication performance measuring equipment, the second recording unit 146 monitors the sending/receiving operation of the control packet and the data packet made by the communicating unit 111, and records a start time and a finish time of each of procedures which are defined by FTP. The duration calculating unit 145 calculates a difference between the start time and the finish time recorded for each procedure, as a duration.

The operation of thus-structured eighth communication performance measuring equipment is as follows.

The second recording unit 146 records the start times and the finish times of the respective procedures which are defined by the FTP, and the duration calculating unit 145 calculates, based on both of the recorded times, durations required for various procedures, such as a time required to establish connection and a time required to acquire a file or a plurality of files at once.

[Embodiment]

First, the delay model used in the communication performance measuring equipment according to the present invention will be explained.

In general, a delay time $T_i(sec)$ in transmitting a packet with a size $S(bit)$ from an ith router $R(i)$ to its next router $R(i+i)$ can be expressed as Expression 1, using a queuing delay $q_i(sec)$ which occurs because of another traffic flowing into a queue of the targeted router $R(i)$, a physical propagation delay $d_i(sec)$ in a communication path to the next router $R(i+i)$, and a rate at which the router $R(i)$ outputs the packet to the communication path, that is, a transmission rate $b_i(bps)$.

$$T_i = q_i + S/b_i + d_i \quad (1)$$

Further, the delay time T in transmitting the packet with a size S through a path which is formed of n routers is the sum total of the delay times $T_i$ corresponding to the respective routers, and therefore, it is naturally equal to the sum total of the respective factors of the delay times $T_i$, that is, the queuing delays qi, the propagation delays di, and processing delays S/bi depending on the transmission rates bi of the routers and the size S of the packet.

Therefore, the delay time T can be expressed as Expression 2 by using a sum total Q of the queuing delays qi, a sum total D of the propagation delays di and an inverting number B of the sum total of inverting numbers of the transmission rates 1/bi.

$$T=Q+S/B+D \qquad (2)$$

Namely, the n routers existing on the path can be replaced by one router which has a characteristic value reflecting the characteristics of these routers. Thus, it is possible to form the delay model in which the complicated network is simplified.

Figure 7:
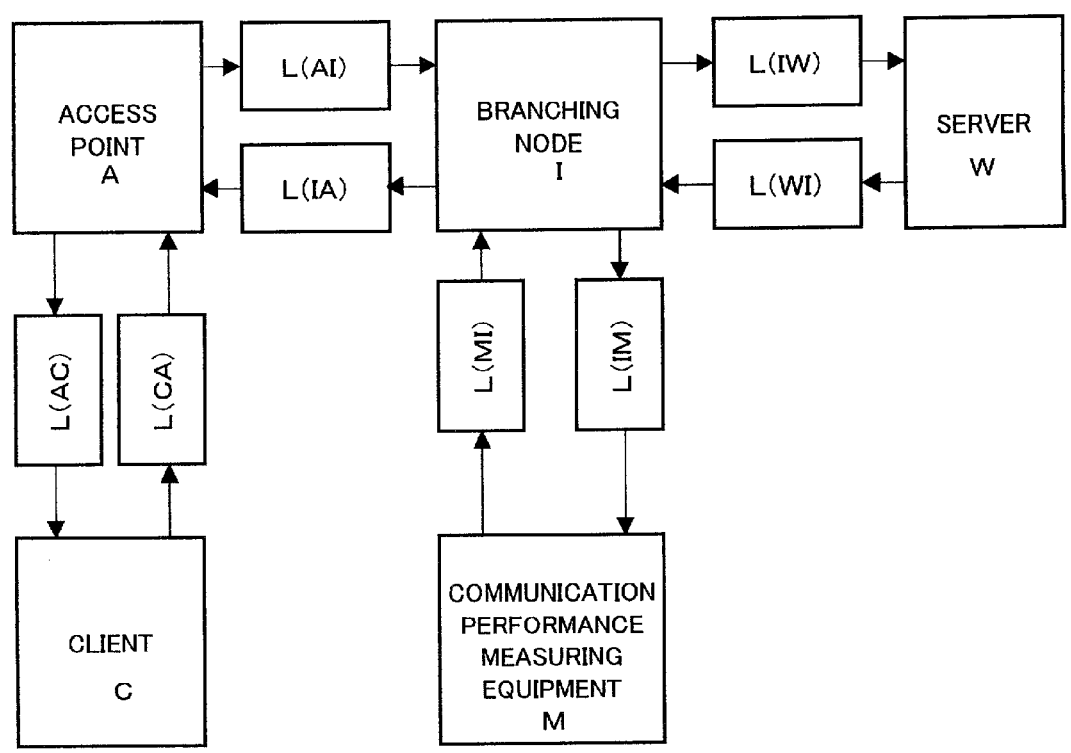
FIG. 7 is an explanatory diagram showing delay models of a network.

FIG. 7 is a view explaining the delay models of the network.

In FIG. 7, "C", "A", "I", "M" and "W" represent the client, an access point, the branching node, the communication performance measuring equipment and the server, respectively.

Further, in FIG. 7, "L(XY)" represents a delay model of a virtual router which corresponds to at least one router being placed on a path from a node X to a node Y. For example, "L(AI)" represents the delay model of a virtual router which is placed on the path from the access point to the branching node.

According to the delay models of the network, a time T(S, L(XY)) necessary for the packet whose size is S to pass through the router shown in the delay model L(XY) can be expressed as Expression 3, by using a queuing delay q(L(XY)), a transmission rate b(L(XY)) and a propagation delay d(LX(Y)), in the delay model L(XY).

$$T(S, L(XY))=q(L(XY))+S/b(L(XY))+d(L(XY)) \qquad (3)$$

Using this delay model, the times required to pass through the respective routers which are placed on the path from the node X to the node Y are added together so that the time required to transmit the packet whose size is S from an arbitrary node to another arbitrary node which are connected to the network can be obtained.

Next, a concrete structure of the communication performance measuring equipment according to the present invention will be explained.

Figure 8:
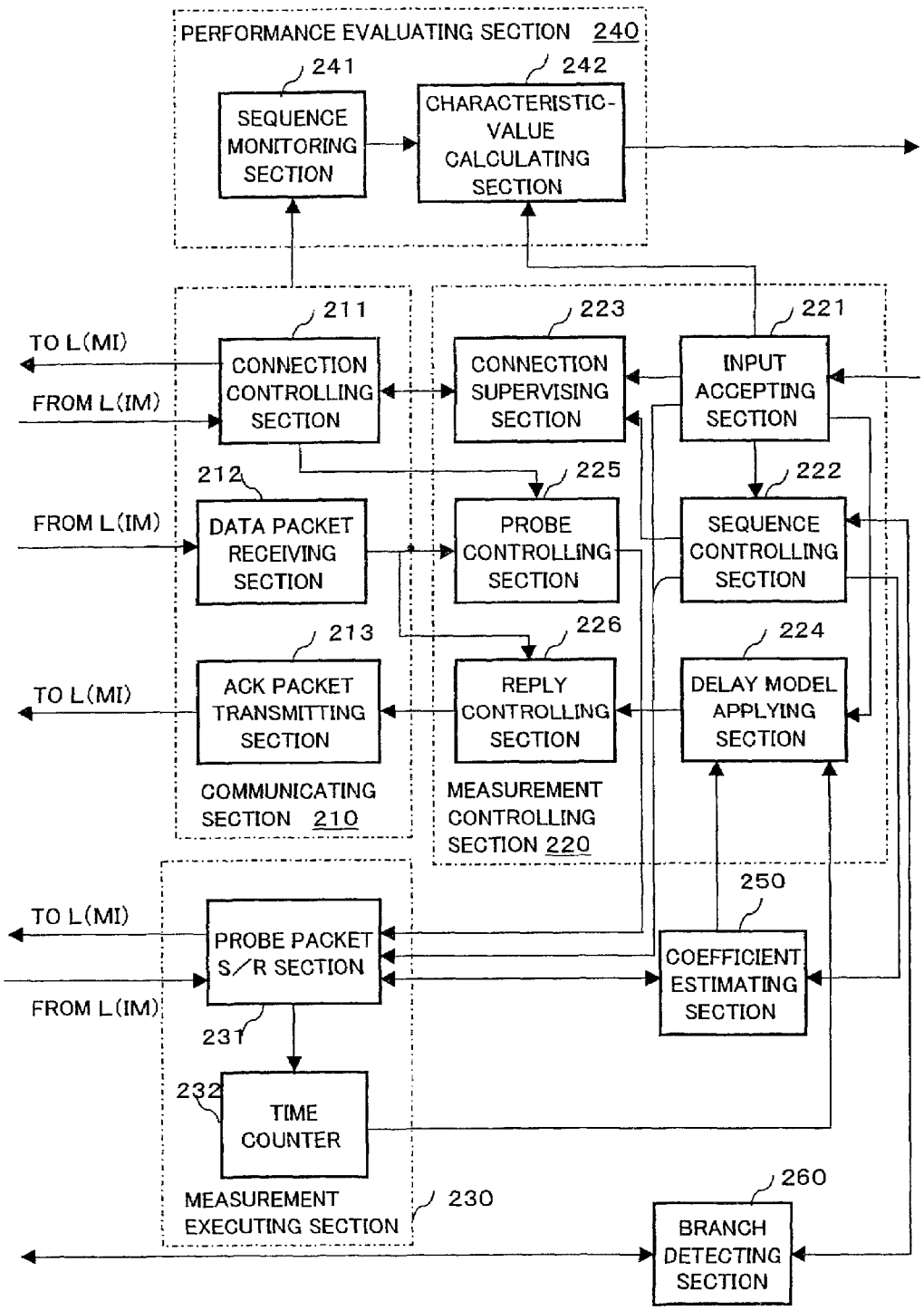
FIG. 8 shows an embodiment of the communication performance measuring equipment according to the present invention.

FIG. 8 shows an embodiment of the communication performance measuring equipment according to the present invention.

In the communication performance measuring equipment shown in FIG. 8, a communicating section 210 establishes connection with the server 102 shown in FIG. 7, according to an instruction from a measurement controlling section 220, and exchanges the data packet and the control packet through the connection. Further, in FIG. 8, a measurement executing section 230 carries out operation of exchanging a predetermined frame with the branching node 103 or the client 101 shown in FIG. 7 according to a procedure defined by ICMP (Internet Control Message Protocol), that is, ping (Packet Internet Groper) operation, based on the instruction from the measurement controlling section 220. Moreover, in this process, the measurement executing section 230 collects information about the paths between the communication performance measuring equipment and the branching node 103 or the client 101. Furthermore, in FIG. 8, a performance evaluating section 240 monitors the communication by the communicating section 210, and evaluates the communication performance of the paths between the client 101 and the server 102, based on the time required for the communication. Further, in FIG. 8, a coefficient estimating section 250 controls the operation of the measurement executing section 230 according to the instruction from the measurement controlling section 220, and, based on obtained data from the measurement executing section 230, estimates a coefficient which is among the coefficients of the delay models and specified by the instruction, and returns the estimated value to the measurement controlling section 220. Moreover, according to the instruction from the measurement controlling section 220, a branch detecting section 260 shown in FIG. 8 collects information about the paths to the specified destination, and detects, based on the information, the branching node 103 and delivers an identifier specifying the branching node 103 to the measurement controlling section 220.

In the measurement controlling section 220 shown in FIG. 8, an input accepting section 221 accepts the input of the parameters including the server identifier for identifying the server 102 shown in FIG. 7 and the client identifier for identifying the client 101 or the access point. For example, the input accepting section 221 accepts URL of contents provided by the server 102 as the server identifier, and delivers it to a connection supervising section 223. Further, the input accepting section 221 accepts an IP address of the client 101 or the access point as the client identifier, and delivers the client identifier to the measurement executing section 230.

Moreover, the input accepting section 221 accepts input of coefficients of a delay model L(AC) corresponding to the path from the access point to the client 101, as the parameters representing communication environment of the client 101, and subjects these values to be processed by a delay model applying section 224. For example, when the client 101 is connected to the access point through an analog modem, a transmission rate of the analog modem may be inputted as the transmission rates b(L(AC)) and b(L(CA)), a value corresponding to a distance between the client 101 and the access point may be inputted as the propagation delays d(L(AC)) and d(L(CA)), and a numeric value "0" may be inputted as the estimated values of the queuing delays q(L(AC)) and q(L(CA)). Incidentally, when the client 101 is connected to the network at all times through an ADSL modem or the like, it is possible to estimate the values of the queuing delays q(L(AC)) and q(L(CA)) by using a later-described method.

Furthermore, the input accepting section 221 accepts information specifying characteristic values to be outputted as a result of the evaluation of the communication performance of the paths between the client 101 and the server 102, and delivers the information to a sequence controlling section 222 and the performance evaluating section 240.

Based on the received information, the sequence controlling section 222 shown in FIG. 8 assembles the procedure for the measurement, controls the operation of the communicating section 210 through the connection supervising section 223 and instructs the coefficient estimating section 250 to estimate a necessary coefficient.

The connection supervising section 223 shown in FIG. 8 analyzes the URL which is received from the input accepting section 221 in advance, and, according to an instruction from the sequence controlling section 222, instructs a connection controlling section 211 which is provided in the communicating section 210 to establish connection to the server 102 which is indicated by the result of the analysis in the aforementioned URL, and manages exchange of the packet through the connection.

Moreover, a probe controlling section 225 shown in FIG. 8 receives notice of reception of the control packet or the data packet, from the connection controlling section 211 and a data packet receiving section 212 provided in the communicating section 210, and instructs the probe packet sending/receiving (S/R) section 231 provided in the measurement executing section 230 to carry out the ping operation.

Meanwhile, based on a time relating to each ping operation recorded by a time counter 232 provided in the measurement executing section 230 and the delay model, the delay model applying section 224 shown in FIG. 8 estimates a difference between the time when each packet reaches the communication performance measuring equipment and the time when each packet is supposed to reach the client 101.

Based on the estimated value obtained by the delay model applying section 224 and the time when the notice is received, a reply controlling section 226 shown in FIG. 8 determines a timing at which the communication performance measuring equipment should return the acknowledge packet in response to the received packet, and instructs an ACK packet transmitting section 213 to transmit the acknowledge packet at the appropriate timing.

Further, in the performance evaluating section 240 shown in FIG. 8, a sequence monitoring section 241 monitors the operations of the respective sections provided in the communicating section 210, that is, the connection controlling section 211, the data packet receiving section 212 and the ACK packet transmitting section 213, sequentially records the start times and the finish times of the respective procedures which are carried out by the respective sections in accordance with the TCP/IP, and a characteristic-value calculating section 242 processes both recorded times. The characteristic-value calculating section 242 calculates characteristic values which are outputted by instruction.

Here, corresponding relationships between the respective sections shown in FIG. 8 and the respective units shown from FIG. 1 to FIG. 6 will be explained.

The communicating section 210 shown in FIG. 8 corresponds to the communicating unit 111 shown in FIG. 1. Further, the connection supervising section 223 in FIG. 8 operates according to the instruction from the sequence controlling section 222 in order to function as the communication controlling unit 113 shown in FIG. 1. The input accepting section 221 shown in FIG. 8 corresponds to the input unit 112 shown in FIG. 1. Meanwhile, the packet sending/receiving unit 114 shown in FIG. 1 corresponds to the probe packet sending/receiving section 231 shown in FIG. 8, and the situation inspecting unit 115 shown in FIG. 1 corresponds to the time counter 232 shown in FIG. 8. Further, the delay model applying section 224 shown in FIG. 8 corresponds to the delay estimating unit 117 shown in FIG. 1, and the reply controlling section 226 shown in FIG. 8 corresponds to the reply controlling unit 118 shown in FIG. 1. The branch detecting section 260 shown in FIG. 8 corresponds to the path information collecting unit 131 and the branch detecting unit 132 which are provided in the input unit 112, shown in FIG. 3. Meanwhile, in the input unit 112 shown in FIG. 4, the sequence controlling section 222 shown in FIG. 8 starts the processing of the coefficient estimating section 250 in order to perform the function of the secondary transmission instructing unit 133, and the coefficient estimating section 250 performs the function of the round-trip time measuring unit 134 and the coefficient estimating unit 135 shown in FIG. 4. Further, the delay model applying section 224 shown in FIG. 8 performs the function of the respective units provided in the delay estimating unit 117 shown in FIG. 5. The sequence monitoring section 241 performs the function of the first recording unit 144 and the second recording unit 146 provided in the performance estimating unit 119 shown in FIG. 6 by collecting the times at which the respective sections of the communicating section 210 carry out the communication procedures, according to the instruction from the input accepting section 221 shown in FIG. 8. The characteristic-value calculating section 242 shown in FIG. 8 performs the function of the duration calculating unit 145 shown in FIG. 6.

Next, the operation of the communication performance measuring equipment will be explained.

Figure 9:
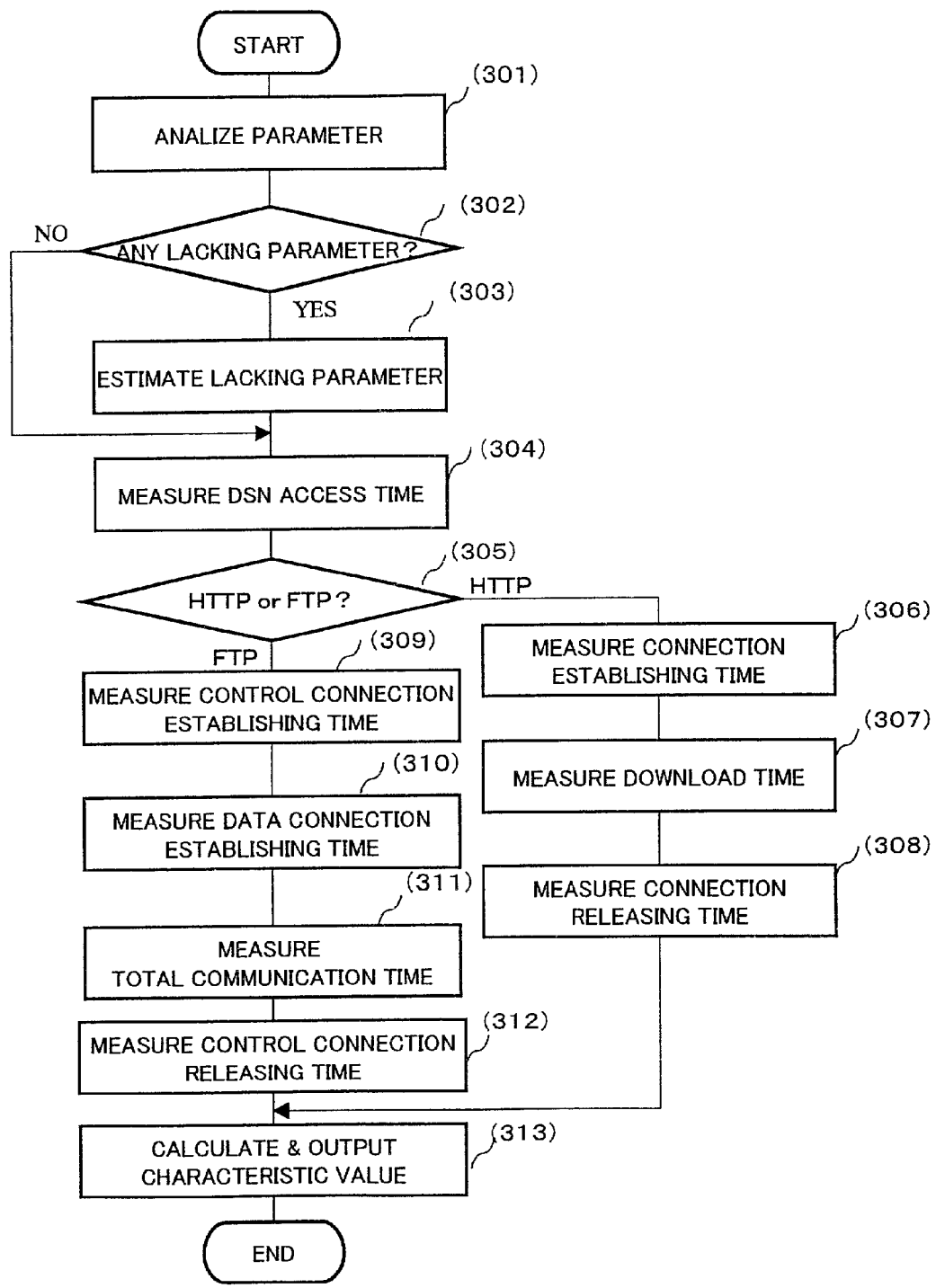
FIG. 9 is a flowchart showing an outline of the operation of the communication performance measuring equipment.

FIG. 9 is a flowchart showing an outline of the operation of the communication performance measuring equipment.

First, the input accepting section 221 accepts inputs of environment parameters including the URL of the contents and the information about the client 101, and the information showing the characteristic values to be outputted, and analyzes these information (Step 301).

The sequence controlling section 222 determines whether the environment parameter which is not inputted through the input accepting section 221 exists or not (Step 302), and when there is a lacking parameter, (positive judgment in the Step 302), it proceeds to Step 303 to estimate the necessary environment parameter.

At this time, the sequence controlling section 222 inputs appropriate instructions to the coefficient estimating section 250 and the branch detecting section 260, according to a type of the lacking parameter.

For example, when the IP address of the branching node 103 is not inputted as the environment parameter, the identifier of the branching node 103 and the transmission rates between the branching node and the communication performance measuring equipment b(L(IM)) and b(L(MI)) and the transmission rates between the branching node and the access point b(L(IA)) and b(L(AI)) are the lacking parameters. In this case, the sequence controlling section 222 discriminates the lacking environment parameters by analyzing the parameters inputted through the input accepting section 221. The sequence controlling section 222 first instructs the branch detecting section 260 to detect the IP address of the branching node 103, and next instructs the coefficient estimating section 250 to estimate the transmission rates b(L(IM)), b(L(MI)), b(L(IA)) and b(L(AI)).

Next, the detailed structures and the operations of the coefficient estimating section 250 and the branch detecting section 260 will be explained.

Figure 10:
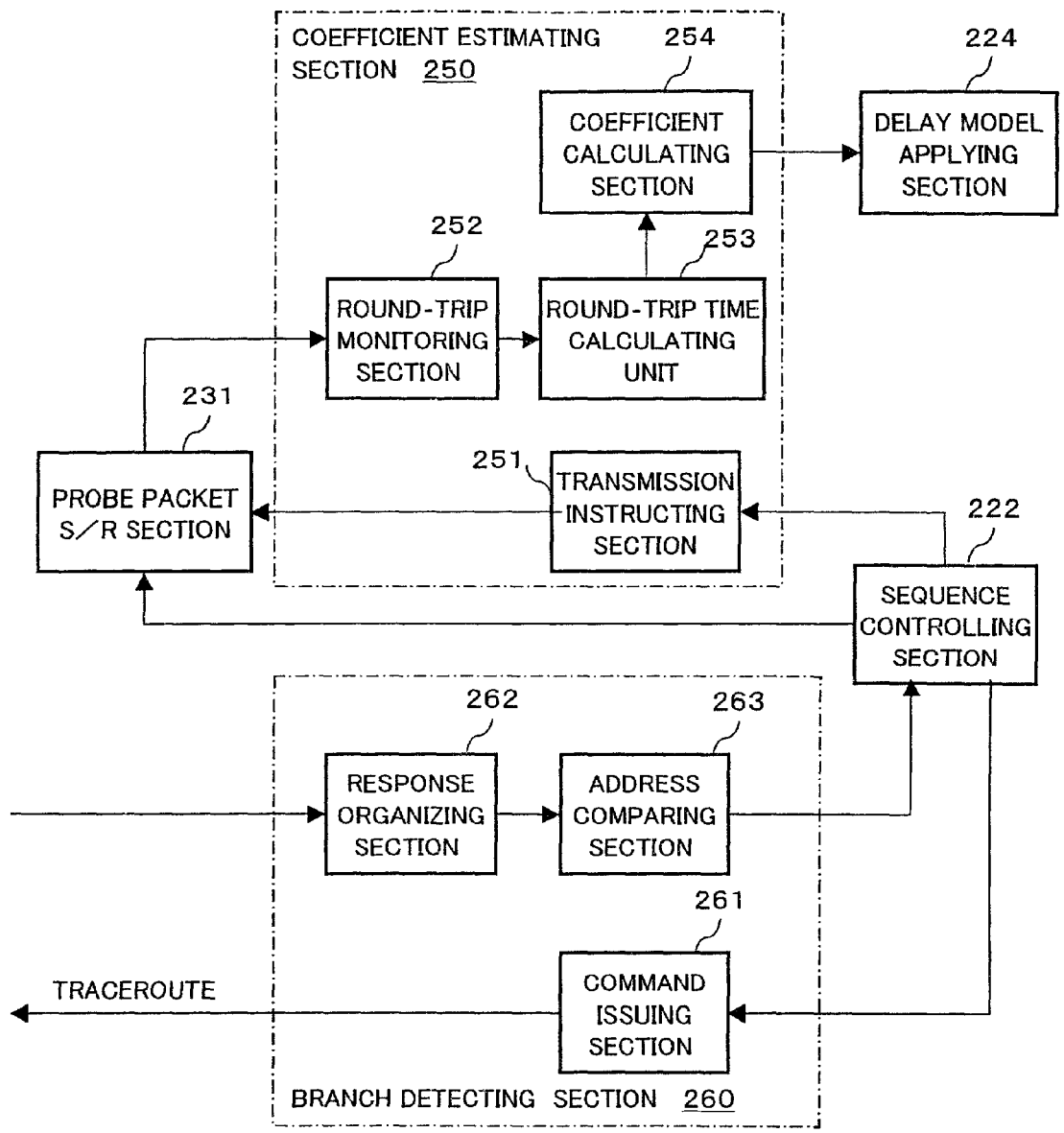
FIG. 10 shows the detailed structures of a coefficient estimating section and a branch detecting section.

FIG. 10 shows the detailed structures of the coefficient estimating section and the branch detecting section.

In the coefficient estimating section 250 shown in FIG. 10, a transmission instructing section 251 receives information specifying paths (X, Y), whose transmission rates should be estimated, from the sequence controlling section 222, and, based on this information, instructs the probe packet sending/receiving section 231 to carry out the ping operation using a probe packet P1 having a data length S1 and a probe packet P2. Further, in FIG. 10, a round-trip monitoring section 252 monitors the operation of the probe packet sending/receiving section 231, and records the respective times when the probe packets P1 and P2 are sent/received. Based on the sequence data recorded by the round-trip monitoring section 252, a round-trip time calculating section 253 calculates the times taken for the probe packets to make round trips to the paths, that is, round trip times RTT1 and RTT2. A coefficient calculating section 254 solves the expressions showing the round trip times RTT1 and RTT2 with respect to the transmission rates, according to delay models L(XY) and L(YX) representing the delays on the paths, thereby obtaining coefficients b(L(XY)) and b(L(YX)) representing the transmission rates, and delivers these estimated values of the coefficients to the delay model applying section 224.

For example, when the transmission rates between the communication performance measuring equipment and the branching node 103 are estimated, the sequence controlling section 222 delivers the IP address of the branching node 103, as information identifying the paths, to the transmission instructing section 251 of the coefficient estimating section 250.

In response to it, the transmission instructing section 251 instructs the probe packet sending/receiving section 231 to transmit the probe packet P1 and the probe packet P2 to the destination designated by the IP address corresponding to the branching node 103.

At this time, based on the sequence data recorded by the round-trip monitoring section 252, the round-trip time calculating section 253 calculates the round trip time RTT1 of the probe packet P1 and the round trip time RTT2 of the probe packet P2.

Here, the round-trip times RTT1 and RTT2 can be expressed as Expression 4 and Expression 5, by using the delay models L(MI) and L(IM) of the paths between the communication performance measuring equipment M and the branching node 1.

$$RTT1 = q(L(MI)) + S1/b(L(MI)) + d(L(MI)) + \quad (4)$$
$$q(L(IM)) + S1/b(L(IM)) + d(L(IM))$$

$$RTT2 = q(L(MI)) + S2/b(L(MI)) + d(L(MI)) + \quad (5)$$
$$q(L(IM)) + S2/b(L(IM)) + d(L(IM))$$

Supposing that the upstream transmission rate b(L(MI)) and the downstream transmission rate b(L(IM)) are equal to each other, the transmission rate b(L(MI)) can be expressed as Expression 6, by using the data lengths S1 and S2 of the probe packets and the round trip times RTT1 and RTT2.

$$b(L(MI)) = b(L(IM)) = \frac{2(S2 - S1)}{RTT2 - RTT1} \quad (6)$$

It should be noted that, in the process of deriving the Expression 6 from the Expression 4 and the Expression 5, the queuing delays q(L(MI)) and q(L(IM)) which are included in the Expression 4 and the queuing delays q(L(MI)) and q(L(IM)) which are included in the Expression 5 are regarded as the same values and hence these are erased. However, since the probe packet P1 and the probe packet P2 are sent/received at different instances, the queuing delays q(L(MI)) and q(L(IM)) are not necessarily the same.

Hence, in order to obtain values which are probable statistically, the transmission instructing section 251 instructs the probe packet sending/receiving section 231 to repeatedly transmit the probe packets a plurality of times, and the coefficient calculating section 254 calculates the coefficient value each time by assigning the round trip times RTT1 and RTT2 which are calculated by the round-trip time calculating section 253 and the data lengths S1 and S2 of the probe packets into the Expression 6, to find a mean value or a median value of the coefficient values. Then, the coefficient calculating section 254 delivers thus-obtained mean value or the median value to the delay model applying section 224 as the transmission rates b(L(XY)) and b(L(YX)).

Incidentally, when the same procedure is carried out by transmitting the probe packets to the destination designated by the IP address corresponding to the access point A, the transmission rates b(L(IA)) and b(L(AI)) between the branching node I and the access point A can be estimated.

Meanwhile, in the branch detecting section 260 shown in FIG. 10, a command issuing section 261 receives the IP address of the server W and the IP address of the access point A from the sequence controlling section 222, and issues a traceroute command to the server W and the access point A, respectively. Note that the traceroute command is a command provided in general operating systems as a standard function to look for the IP addresses of the routers being placed on the path to the destination. Further, in FIG. 10, a response organizing section 262 arranged the IP addresses returned from the routers being placed on the respective paths in response to the traceroute command, in ascending order of a hop count from the communication performance measuring equipment, produces a group A (A1, A2, . . . An) of the IP addresses designating the routers being placed on the paths between the communication performance measuring equipment M and the access point A, and a group B (B1, B2, . . . Bm) of the IP addresses designating the routers being placed on the paths between the communication performance measuring equipment M and the server W, and delivers the IP addresses to an address comparing section 263. The address comparing section 263 compares elements included in the group A and elements included in the group B whose hop counts correspond to each other, and detects an element, corresponding to the hop count immediately before the hop count with which the elements are inconsistent for the first time. The detected element indicates the IP address of the branching node I and this IP address is delivered to the sequence controlling section 222.

After the lacking parameters are estimated as described above, the sequence controlling section 222 instructs the connection supervising section 223 to start measuring operation concerning the communication through the connection to the server W. In response to that, the connection supervising section 223 first operates for measuring the time required to acquire the IP address of the server W from a DNS (Domain Name System) which is included in the environment parameter received from the input accepting section 221, that is, a DNS access time (Step 304). It is needless to say that, when all parameters are inputted in the Step 301 shown in FIG. 9, the Step 302 is judged negative, and the above-described estimating processing of the parameters (the Step 303) should be skipped to proceed to Step 304.

In the Step 304, the connection supervising section 223 first makes an inquiry to the DNS (Domain Name System) which is specified according to the environment parameter received from the input accepting section 221, about the IP address of the server W which holds the contents indicated by the URL specified by the environment parameter as well. At this time, the sequence monitoring section 241 which is provided in the performance evaluating section 240 collects the time when the inquiry is transmitted to the DNS and the time when the IP address is received in response to the inquiry, and the characteristic-value calculating section 242 calculates a DNS access time Ti from a difference between these times and outputs it as one of the characteristic values. Incidentally, when the time required for the DNS access is not specified as the characteristic value to be evaluated, the above-described processing by the connection supervising section 223 may be skipped as long as the IP address of the server W is specified until then.

Next, based on the URL specified by the environment parameter, the sequence controlling section 222 determines whether the procedure to be adopted in the following measuring operation is based on the HTTP or the FTP (Step 305), and, according to the result of the determination, inputs a necessary instruction to the connection supervising section 223.

When it is determined in the Step 305 to adopt the HTTP procedure, the connection supervising section 223 carries out the processing to establish connection to the server W through the connection controlling section 221, according to the HTTP procedure, and evaluates the time required to establish the connection (hereinafter referred to as the connection establishing time) (Step 306).

Here, the operation of evaluating the connection establishing time will be explained.

When instructed by the connection supervising section 223 to establish the connection to the server W, the connection controlling section 221 exchanges the control packets in accordance with a predetermined procedure (hereinafter referred to as the 3-way handshake), thereby establishing the connection.

Figure 11:
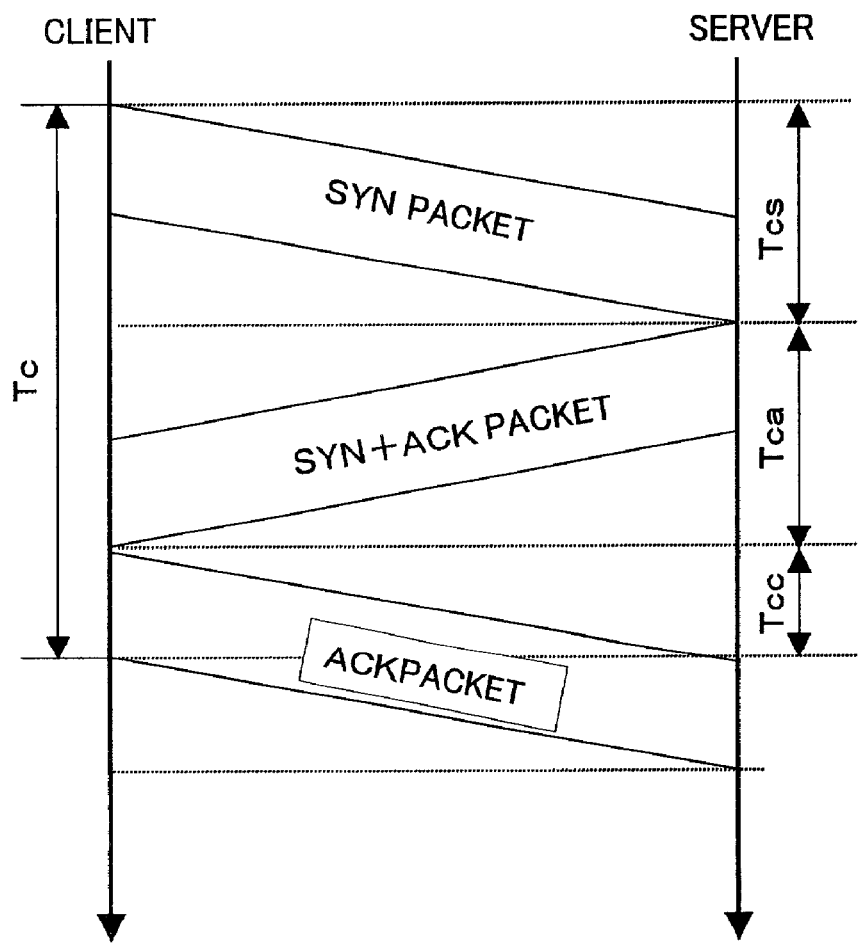
FIG. 11 is a chart explaining a connection establishing procedure by a 3-way handshake.
Figure 12:
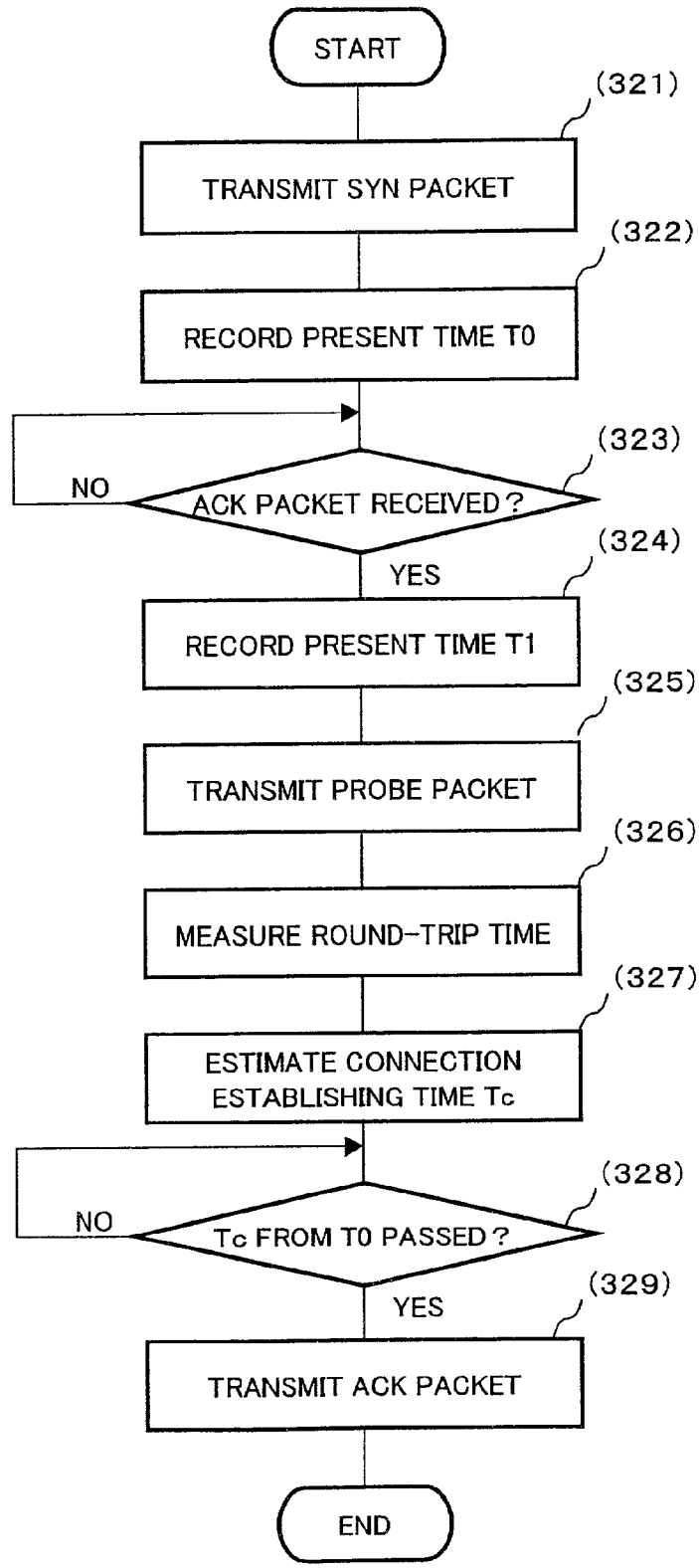
FIG. 12 is a flowchart showing the operation of measuring a connection establishing time.

FIG. 11 is a chart explaining the connection establishing procedure by the 3-way handshake. Further, FIG. 12 is a flowchart showing the operation of evaluating the performance concerning the connection establishment.

When establishing the connection according to the TCP as shown in FIG. 11, the client C transmits a control packet signifying connection request (hereinafter referred to as the SYN packet) to the server W, receives a control packet signifying connection acknowledge and connection request (hereinafter referred to as the SYN+ACK packet) from the server W, and thereafter, transmits an acknowledge packet (hereinafter referred to as the ACK packet). The processing concerning the connection establishment by the client C completes at the time when the ACK packet is transmitted to the communication path, and all the connection establishing procedures complete at the time when the ACK packet reaches the server W. Therefore, when viewed from the client side, the time required to establish the connection between the client C and the server W, that is, a connection establishing time Tc, is the sum of the time required to deliver the SYN packet from the client C to the server W (indicated by "Tcs" in FIG. 11), the time required to transmit the SYN+ACK packet from the server W to the client C (indicated by "Tca" in FIG. 11), and the time required to transmit the ACK packet from the client C to the communication path (indicated by "Tcc" in FIG. 11). Hence, the connection establishing time Tc can be expressed as Expression 7, by using a data length $S^{SYN}$ of the SYN packet, a data length $S^{SYN+ACK}$ of the SYN+ACK packet, a data length $S^{ACK}$ of the ACK packet and the delay models of the network as shown in FIG. 7.

$$Tc = D(s^{SYN}, L(CA)) + D(s^{SYN}, L(AI)) + D(s^{SYN}, L(IW)) + \quad (7)$$
$$D(s^{SYN+ACK}, L(WI)) + D(s^{SYN+ACK}, L(IA)) +$$
$$D(s^{SYN+ACK}, L(AC)) + s^{ack}/b(L(CA))$$

Next, a method of finding the connection establishing time Tc shown in FIG. 11, by using a ping function of the probe packet sending/receiving section 231 shown in FIG. 8 will be explained.

First, according to an instruction from the connection supervising section 223 shown in FIG. 8, the connection controlling section 221 transmits the SYN packet to the server W as its destination, and at this instance, the sequence monitoring section 241 records the present time as a reference time T0 (Steps 321 and 322 shown in FIG. 12).

When the SYN+ACK packet is received from the server W, Step 323 is judged positive and it proceeds to Step 324, where the sequence monitoring section 241 shown in FIG. 8 records a present time T1. Further, the probe controlling section 225 receives notice of the reception of the control packet from the connection controlling section 211, and in response to this, instructs the probe packet sending/receiving section 231 to carry out the ping operation. According to this instruction, the probe packet sending/receiving section 231 transmits the probe packets, whose data lengths are $S^{ping}$ respectively, to the branching node I and the access point A as the destinations (Step 325 shown in FIG. 12).

At this time, the time counter 232 shown in FIG. 8 records the respective times when the probe packet sending/receiving section 231 transmits the probe packets to the branching node I and the access point A, and the time when the acknowledge packets corresponding to the probe packets reach the probe packet sending/receiving section 231, and obtains differences among the recorded times and delivers the differences to the delay model applying section 224, as round trip times RTTa and RTTb which are required for the probe packets to make round trips between the branching node I or the access point A, and the communication performance measuring equipment M (Step 326 in FIG. 12).

At this time, according to the instruction from the sequence controlling section 222, the delay model applying section 224 carries out the processing of estimating the connection establishing time Tc of the client C, based on the round trip times RTTa and RTTb, the times T0 and T1 recorded in the Steps 321 and 324, and the delay models of the network shown in FIG. 7 (Step 327).

It should be mentioned that the round trip times RTTa and RTTb and the time W (T1−T0) from when the SYN packet is transmitted from the communication performance measuring equipment M to when the SYN+ACK packet is received from the server W can be expressed as Expression 8 to Expression 10, by applying the delay models.

$$RTTa = D(s^{ping}, L(MI)) + D(s^{ping}, L(IM)) \quad (8)$$

$$RTTb = RTTa + D(s^{ping}, L(IA)) + D(s^{ping}, L(AI)) \quad (9)$$

$$T1 - T0 = D(s^{SYN}, L(MI)) + D(s^{SYN}, L(IW)) + \quad (10)$$
$$D(s^{SYN+ACK}, L(WI)) + D(s^{SYN+ACK}, L(IM))$$

Moreover, when the Expression 7 is rewritten by using the Expression 8 to Expression 10, it is possible to express the connection establishing time Tc as Expression 11, by using the round trip times RTTa and RTTb and the time (T1−T0) which are the measured values, and the respective coeffi cients of the delay models and the sizes of the respective control packets which are already known.

$$Tc = RTTb - 2RTTa + T1 - T0 + d(L(CA)) + d(L(AC)) + \quad (11)$$

$$q(L(CA)) + q(L(AC)) + \frac{s^{syn}}{b(L(CA))} + \frac{s^{syn+ack}}{b(L(AC))} +$$

$$(s^{syn} - s^{ping})\left(\frac{1}{b(L(AI))} - \frac{1}{b(L(MI))}\right) +$$

$$(s^{syn+ack} - s^{ping})\left(\frac{1}{b(L(IA))} - \frac{1}{b(L(IM))}\right) + \frac{s^{ack}}{b(L(CA))}$$

Therefore, the delay model applying section 224 assigns the round trip times RTTa and RTTb and the time (T1–T0), which are received from the time counter 232, and the respective coefficients of the delay models into the Expression 11, whereby it is possible to find the connection establishing time Tc. Thus-obtained connection establishing time Tc is delivered to the reply controlling section 226 shown in FIG. 8.

Correspondingly, the reply controlling section 226 compares the present time with the time which is the time T0 added with the connection establishing time Tc, and when these are consistent with each other, Step 328 is judged positive, and the reply controlling section 226 instructs the ACK packet transmitting section 213 shown in FIG. 8 to transmit the ACK packet. In response to this instruction, the ACK packet transmitting section 213 transmits the ACK packet (Step 329), and the connection is established between the communication performance measuring equipment M and the server W.

After the connection to the server W is established, the connection supervising section 223 instructs the connection controlling section 211 to acquire a targeted file or contents, based on the URL specified as the environment parameter, and evaluates the time required to download the file or the contents, that is, a download time Td (refer to Step 307 shown in FIG. 9).

Here, the evaluating operation of the download time Td will be explained.

Figure 13:
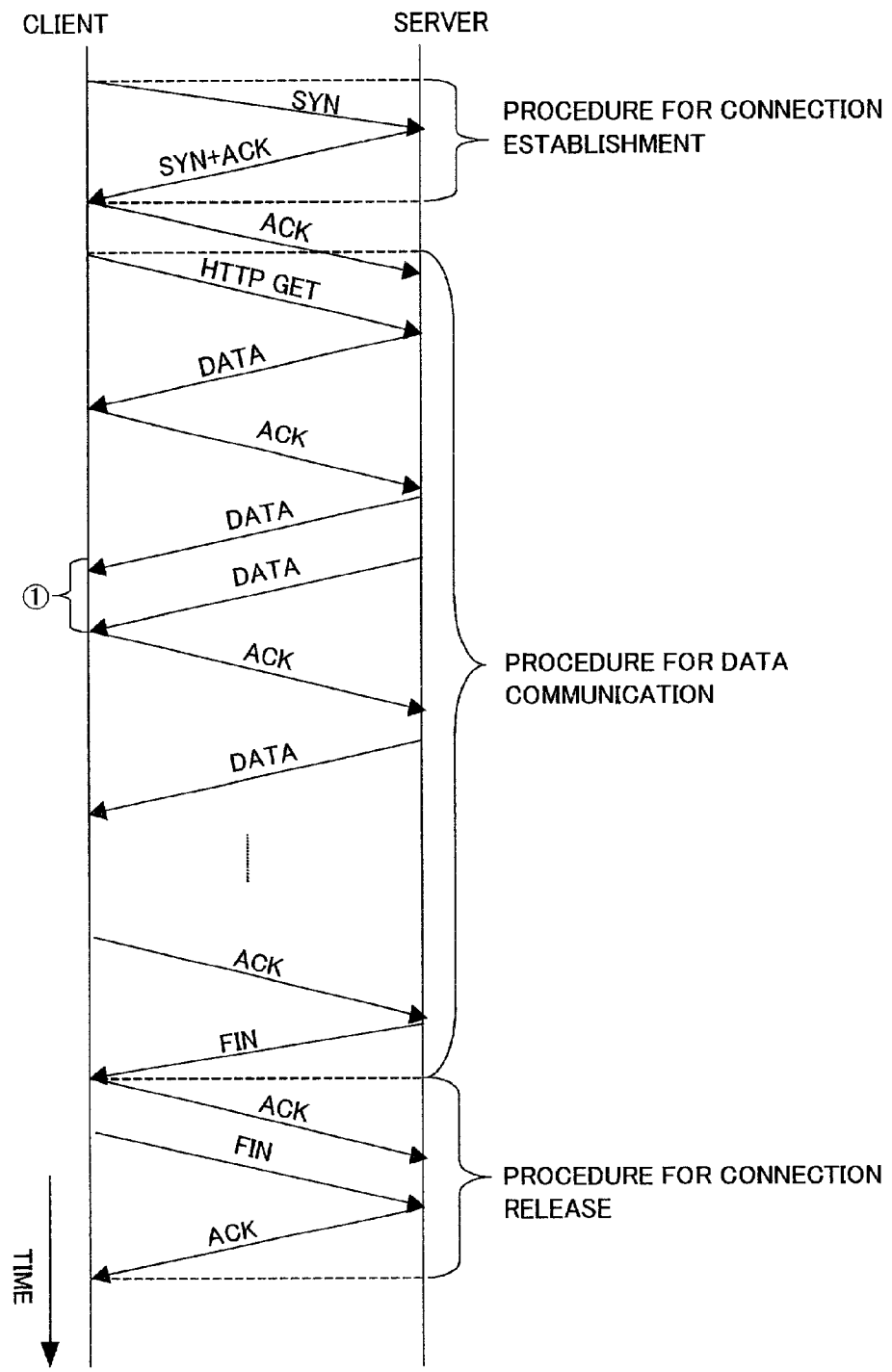
FIG. 13 is a sequence chart explaining data communication by an HTTP procedure.

FIG. 13 is a sequence chart explaining the data communication according to the HTTP procedure.

According to the HTTP procedure, after the connection is established by the above-described connection establishing procedure, the client C transmits an HTTP GET request to the server W, thereby requesting the target file or the contents. In response to the request, the server W divides the specified file or the contents into a plurality of data packets (indicated by "DATA" in FIG. 13) to transmit these, and the client C returns the ACK packet to the server W every time receiving the data packet. When the transmission of all data packets is completed, the server W transmits a FIN packet signifying the completion of the download, and correspondingly, the procedure for releasing the connection between the client C and the server W starts.

Figure 14:
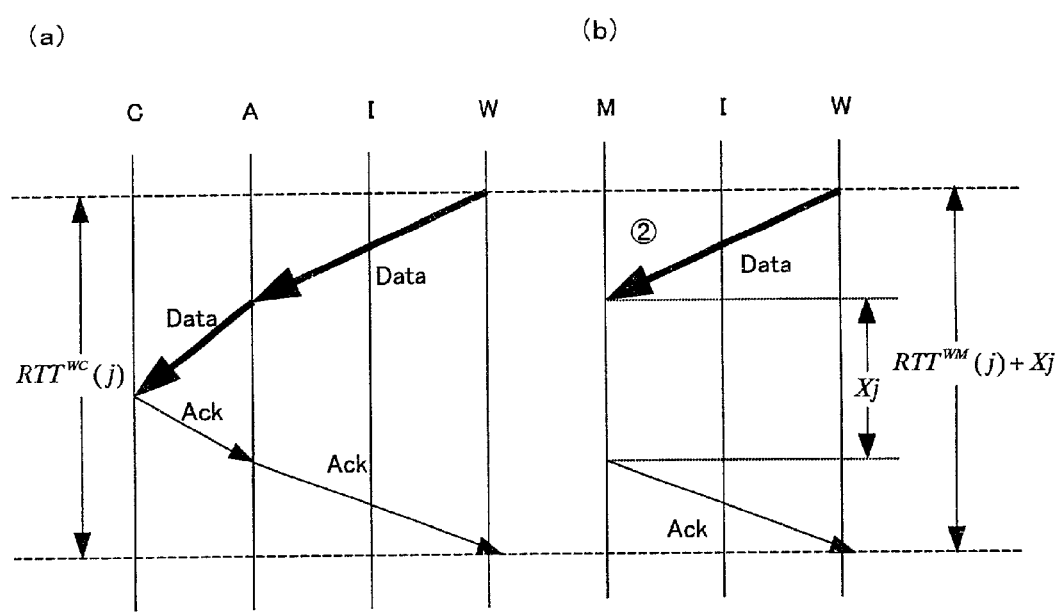
FIG. 14 is a chart explaining a measuring principle of a download time.

Incidentally, as shown in FIG. 14(*a*), a sending/receiving sequence of each data packet between the client C and the server W consists of a sequence of the data packet transmitting from the server W and passing through the branching node I and the access point A to reach the client C, and a sequence of the ACK packet transmitting from the client C and passing through the access point A and the branching node I to reach the server W. Meanwhile, as is clear from FIG. 7, a sending/receiving sequence of each data packet between the communication performance measuring equipment M and the server W consists of a sequence of the data packet transmitting from the server W and passing through the branching node I to reach the communication performance measuring equipment M, and a sequence of the ACK packet transmitting from the communication performance measuring equipment M and passing through the branching node I to reach the server W.

Therefore, supposed that a difference Xj between a time $RTT^{WC}(j)$ required for a sending/receiving sequence which is for sending/receiving a jth data packet between the client C and the server W, and a time required for a sending/receiving sequence which is for sending/receiving the same data packet between the communication performance measuring equipment M and the server W is to be estimated, and the ACK packet is to be transmitted to the server W awaiting time equivalent to the difference Xj after receipt of the jth data packet from the server W, as shown in FIG. 14(*b*), it is possible to artificially simulate the sending/receiving sequence between the client C and the server W irrespective of the position of the communication performance measuring equipment M.

Figure 15:
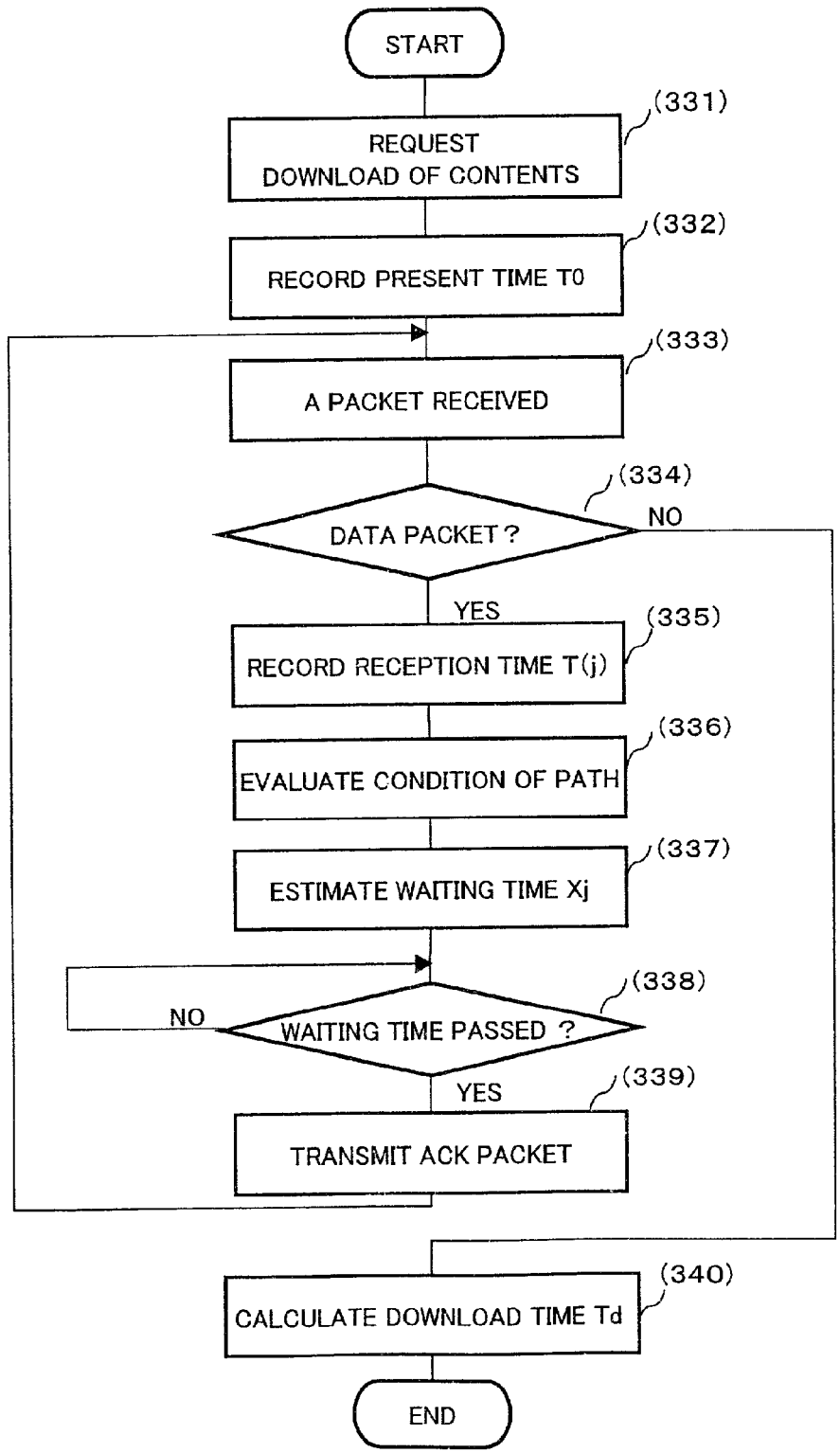
FIG. 15 is a flowchart showing the operation of evaluating the download time.

FIG. 15 is a flowchart showing the operation of measuring the download time.

In response to the instruction from the connection supervising section 223 shown in FIG. 8, the connection controlling section 221 transmits the HTTP GET request to the server W to request the download of the contents (Step 331). At this time, the sequence monitoring section 241 of the performance evaluating section 240 shown in FIG. 8 records a present time T0 (Step 332).

Thereafter, every time the packet is received by the data packet receiving section 212 (Step 333), the data packet receiving section 212 determines whether the packet is the data packet or the FIN packet signifying the end of the data transfer (Step 334). When the packet received in the Step 333 is the data packet (positive judgment in the Step 334), the reply controlling section 226 records the present time as a reception time T0) corresponding to the order j of the reception of the data packet, according to the notice from the data packet receiving section 212 shown in FIG. 8 (Step 335).

According to the notice, the probe controlling section 225 shown in FIG. 8 outputs the instruction of transmitting the probe packet to the branching node I and the access point A, respectively, and, according to the instruction, the probe packet sending/receiving section 231 transmits the probe packet to the specified destinations. Thereby, evaluating conditions of the paths between the communication performance measuring equipment M and the branching node I or the access point A starts (Step 336). At this time, the time counter 232 shown in FIG. 8 measures a round trip time $RTT^{MI}(j)$ from when the probe packet is transmitted to the branching node I as its destination to when the acknowledge packet is returned in response to the probe packet, and a round trip time $RTT^{MA}(j)$ from when the probe packet is transmitted to the access point A as its destination to when the acknowledge packet is returned in response to the probe packet, and delivers the round trip times to the delay model applying section 224.

Based on the round trip times $RTT^{MI}(j)$ and $RTT^{MA}(j)$, the data length $S^{ping}$ of the probe packet and a data length $S^{data}(j)$ of the jth data packet, the delay model applying section 224 estimates the difference (hereinafter referred to as the waiting time) Xj of the delay times shown in FIG. 14 (Step 337) and delivers it to the reply controlling section 226.

Here, a method of estimating the waiting time Xj will be explained.

As described above, the waiting time Xj can be expressed as Expression 12 by using a data delivering time $RTT^{WC}(j)$ which is required to complete the sequence of delivering the jth data packet between the client C and the server W, and a data delivering time $RTT^{WM}(j)$ which is required to complete the sequence of delivering the same data packet between the communication performance measuring equipment M and the server W.

$$Xj = RTT^{WC}(j) - RTT^{WM}(j) \quad (12)$$

Meanwhile, when the delay models of the network as shown in FIG. 7 are applied thereto, the round trip times $RTT^{MI}(j)$ and $RTT^{MA}(j)$ which are actually measured in the step 335, can be expressed as Expressions 13 and 14, and the data delivering time $RTT^{WM}(j)$ can be expressed as Expression 15 by using the data length $S^{data}(j)$ of the jth data packet, a data length $S^{ack}$ of the ACK packet, and the data length $S^{ping}$ of the probe packet.

$$RTT_j^{MI} = D(s^{ping}, L(MI)) + D(s^{ping}, L(IM)) \quad (13)$$

$$\begin{aligned} RTT_j^{MA} &= D(s^{ping}, L(MI)) + D(s^{ping}, L(IA)) + \\ &\quad D(s^{ping}, L(AI)) + D(s^{ping}, L(IM)) \\ &= RTT_j^{MI} + D(s^{ping}, L(IA)) + D(s^{ping}, L(AI)) \end{aligned} \quad (14)$$

$$\begin{aligned} RTT_j^{WM} &= D(s_j^{data}, L(WI)) + D(s_j^{data}, L(IM)) + \\ &\quad D(s^{ack}, L(MI)) + D(s^{ack}, L(IW)) \end{aligned} \quad (15)$$

Note that, when the data packets are actually delivered between the server W and the client C, the data packets may be transmitted from the server W in a burst mode, as indicated by "①" in FIG. 13. In this case, it is necessary to add a factor representing a queuing delay $q^{bottle}(j)$ caused by the data packet itself, which is transmitted from the server W to the client C, to the delay model shown in the Expression 3. Hence, the data delivering time $RTT^{WC}(j)$ can be expressed as Expression 16.

$$\begin{aligned} RTT_j^{WC} &= D(s_j^{data}, L(WI)) + D(s_j^{data}, L(IA)) + \\ &\quad D(s_j^{data}, L(AC)) + D(s^{ack}, L(CA)) + \\ &\quad D(s^{ack}, L(AI)) + D(s^{ack}, L(IW)) + q_j^{bottle} \end{aligned} \quad (16)$$

By rewriting the Expression 12 by using the Expression 13 to Expression 16, the waiting time Xj can be expressed as shown as Expression 17, by using the actually measured values of the round trip times $RTT^{MI}(j)$ and $RTT^{MA}(j)$, the data lengths of the respective packets $S^{data}(j)$, $S^{ack}$ and $S^{ping}$, the coefficients of router models about the respective paths and the queuing delay factor $q^{bottle}(j)$.

$$\begin{aligned} X_j &= RTT_j^{MA} - 2RTT_j^{MI} + \\ &\quad (s_j^{data} - s^{ping})\left(\frac{1}{b(L(IA))} - \frac{1}{b(L(IM))}\right) + \\ &\quad \frac{s_j^{data}}{b(L(AC))} + (s^{ack} - s^{ping})\left(\frac{1}{b(L(AI))} - \frac{1}{b(L(MI))}\right) + \end{aligned} \quad (17)$$

-continued $$\frac{s^{ack}}{b(L(CA))} + d(L(AC)) + d(L(CA)) +$$

$$q(L(AC)) + q(L(AC)) + q_j^{bottle}$$

Figure 16:
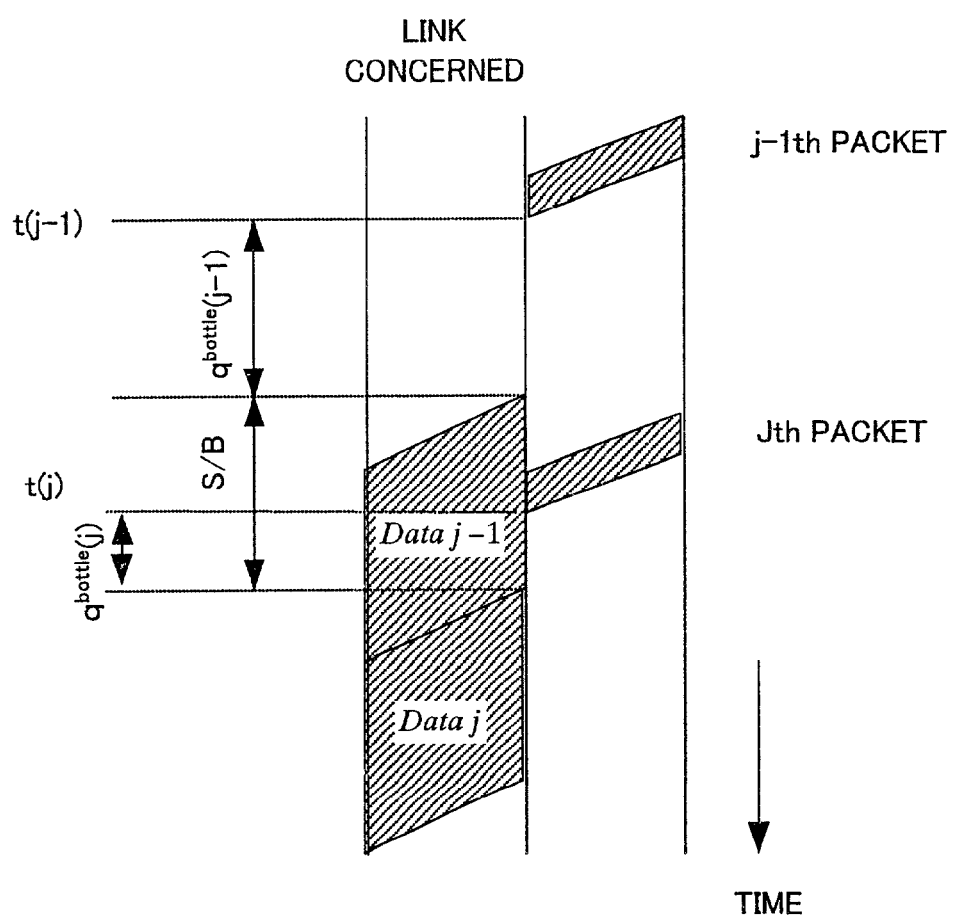
FIG. 16 is a chart explaining a queuing delay.

This queuing delay factor $q^{bottle}(j)$ appears when the packet is inputted to the path at a rate faster than a rate at which the path outputs the packet to the next path, in at least a part of the paths through which the data packets and the ACK packets are exchanged on the path between the server W and the client C. Therefore, as shown in FIG. 16, when a j−1st packet is inputted to a link with the accumulated packets, that is, when a queuing delay $q^{bottle}(j)$ occurs at a time t(j−1), the queuing delay of this link increases by the amount obtained by dividing the size S of the packet by a transmission rate B of the link, due to the arrival of the j−1 st packet. Therefore, the queuing delay factor $q^{bottle}(j)$ at a time t(j) when the jth packet arrives this link can be expressed as Expression 18 by using the times t(j−1) and t(j), the size S of the packet and the transmission rate B of the link.

$$q^{bottle}(j) = \max[0, \{q^{bottle}(j-1) + S/B - (t(j) - t(j-1))\}] \quad (18)$$

When the model shown in the Expression 18 is applied to the paths between the branching node I and the client C, the queuing delay $q^{bottle}(j)$ due to its own traffic between the branching node I and the client C can be expressed as Expression 19, by using the sizes of the respective packets and the coefficients of the router models of the respective paths.

$$q_j^{bottle} = \max\left(0, \max\left(\frac{s_{j-1}^{data}}{b(L(IA))}, \frac{s_{j-1}^{data}}{b(L(AC))}, \frac{s^{ack}}{b(L(CA))}, \frac{s^{ack}}{b(L(AI))}\right) + q_{j-1}^{bottle} - (t(j) - t(j-1))\right) \quad (19)$$

The delay model applying section 224 calculates a value of the queuing delay $q^{bottle}(j)$ based on the Expression 19, and assigns the value into the Expression 18, thereby finding the waiting time Xj reflecting the conditions of the paths between the server W and the access point A at the time when the jth data packet is transmitted from the server W. Then, thus-calculated waiting time Xj is inputted to the reply controlling section 226.

The reply controlling section 226 shown in FIG. 8 monitors the present time, and, after the waiting time Xj has passed from the reception time T(j) recorded in the step 335 shown in FIG. 15, instructs the ACK packet transmitting section 213 to transmit the ACK packet as positive judgment of Step 338. Further, according to the instruction, the ACK packet transmitting section 213 transmits the ACK packet to the server W as its destination (Step 339), and thereafter, the download time measurement processing returns to the step 333 to receive the next packet.

Meanwhile, when it returns to the Step 333 to receive the FIN packet (negative judgment in the Step 334), the sequence monitoring section 241 in the performance evaluating section 240 records, for example, a time T1 when it receives the FIN packet, and delivers the time T1 and the time T0 which is already recorded in the step 332 to the characteristic-value calculating section 242. Then, the characteristic-value calculating section 242 subtracts the time T0 from the time T1, that is, calculates the download time Td (Step 340), to complete the evaluating processing of the download time.

After the processing of the Step 307 in which the download time is obtained according to the above procedures, shown in FIG. 9 completes, it proceeds to Step 308 to evaluate the time required to release the connection between the server W and the client C, that is, a connection releasing time.

Next, the evaluating operation of the connection releasing time will be explained.

Figure 17:
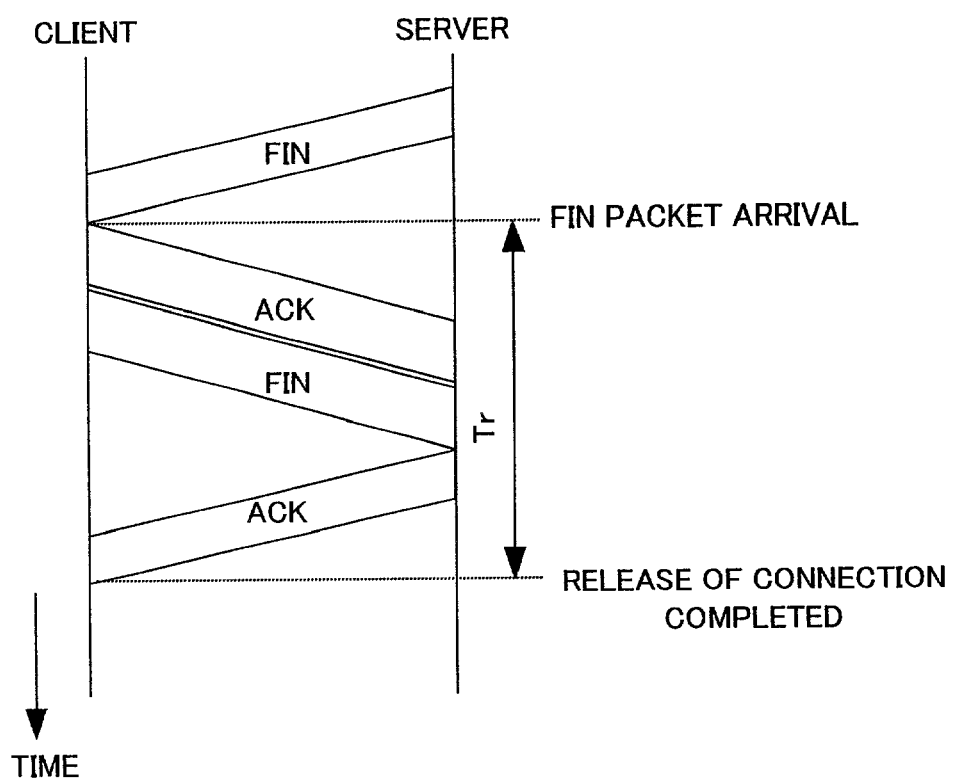
FIG. 17 is a chart explaining a connection releasing time.

FIG. 17 is a chart explaining the connection releasing time.

When the connection has been established between the server W and the client C, this connection is released after the FIN packet and the ACK packet are exchanged between the server W and the client C, as shown in FIG. 17. When viewed from the client C side, its connection to the server W is released at the time when the ACK packet which is transmitted from the server W reaches the client C, and hence the connection releasing time Tr for the client C is the time from when the FIN packet reaches from the server W to when the aforesaid ACK packet is returned from the server W. Therefore, the connection releasing time Tr can be expressed as Expression 20, by using a data length $S^{FIN}$ of the FIN packet, the data length $S^{ack}$ of the ACK packet, and the coefficients of the respective router models which exist on the paths between the server W and the client C.

$$Tr = \frac{s^{ack}}{b(L(CA))} + D(s^{fin}, L(CA)) + D(s^{fin}, L(AI)) + \quad (20)$$
$$D(s^{fin}, L(IW)) + D(s^{ack}, L(WI)) +$$
$$D(s^{ack}, L(IA)) + D(s^{ack}, L(AC))$$

Figure 18:
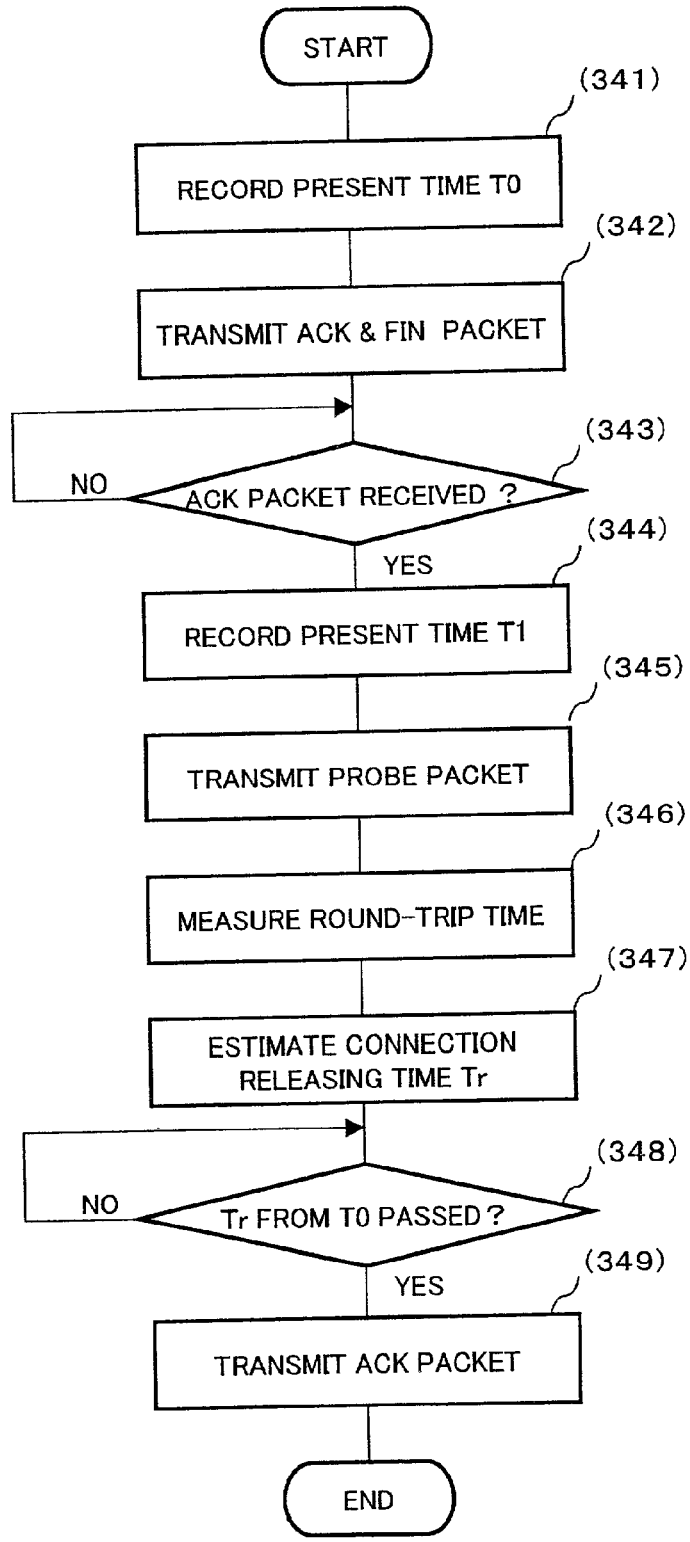
FIG. 18 is a flowchart showing the operation of evaluating a connection releasing time.

FIG. 18 is a flowchart showing the evaluating operation of the connection releasing time.

When the FIN packet from the server W reaches the communication performance measuring equipment M, the sequence monitoring section 241 in the performance evaluating section 240 shown in FIG. 8 records a FIN arrival time T0 (Step 341). Next, the communicating section 210 transmits the ACK packet and the FIN packet to the server W, based on the TCP (Step 342).

Thereafter, receiving the ACK packet from the server W causes positive judgment of Step 343, which leads to proceeding to Step 344. In Step 344 a value obtained by subtracting the FIN arrival time T0 from the present time T1 is delivered to the delay model applying section 224 as a measured value of a duration required to release the connection between the server W and the communication performance measuring equipment M, that is, a connection releasing time $Tr^{MW}$.

At this time, according to an instruction from the probe controlling section 225 shown in FIG. 8, the probe packet sending/receiving section 231 transmits the probe packets to the branching node I and the access point A (Step 345), and the time counter 232 measures the round trip times RTTa and RTTb of the respective probe packets (Step 346).

The delay model applying section 224 estimates the connection releasing time Tr between the server W and the client C, based on the round trip times RTTa and RTTb which are measured in the Step 346 and the measured value of the connection releasing time $Tr^{MW}$ (Step 347).

Here, the connection releasing time $Tr^{MW}$ between the server W and the communication performance measuring equipment can be expressed as Expression 21, by using the data length $S^{FIN}$ of the FIN packet, the data length $S^{ack}$ of the ACK packet, and the coefficients of the respective router models of the paths between the server W and the communication performance measuring equipment M, and further, the round trip times RTTa and RTTb can be expressed as the Expression 8 and the Expression 9, respectively.

$$Tr^{MW} = \frac{s^{ack}}{b(L(MI))} + D(s^{fin}, L(MI)) + D(s^{fin}, L(IW)) + \quad (21)$$
$$D(s^{ack}, L(WI)) + D(s^{ack}, L(IM))$$

When the Expression 20 is rewritten by using these Expressions (8), (9), and (20), the connection releasing time Tr between the server W and the client C can be expressed as Expression 22, by using the measured value of the connection releasing time $Tr^{MW}$, the round trip times RTTa and RTTb, the data lengths of the respective packets, and the respective coefficients of the router models which exist between the server W and the client C.

$$Tr = Tr^{MW} + s^{ack}\left(\frac{1}{b(L(CA))} - \frac{1}{b(L(MI))}\right) + RTTb - 2RTTa + \quad (22)$$
$$(s^{fin} - s^{ping})\left(\frac{1}{b(L(AI))} - \frac{1}{b(L(MI))}\right) +$$
$$(s^{ack} - s^{ping})\left(\frac{1}{b(L(IA))} - \frac{1}{b(L(IM))}\right) +$$
$$D(s^{fin}, L(CA)) + D(s^{ack}, L(AC))$$

The delay model applying section 224 estimates the connection releasing time Tr by using this Expression 22, and delivers the result of the estimation to the reply controlling section 226 shown in FIG. 8.

After the connection releasing time Tr has passed from the FIN arrival time T0, the reply controlling section 226 instructs the ACK packet transmitting section 213 to transmit the ACK packet as positive judgment of Step 348 shown in FIG. 18. In response to this instruction, the ACK packet transmitting section 213 returns the ACK packet to the server W in Step 349, whereby the procedure for releasing the connection between the server W and the communication performance measuring equipment M completes.

After evaluating the DNS access time Ti, the connection establishing time Tc, the download time Td and the connection releasing time Tr in the Step 304, Step 306, Step 307 and Step 308 shown in FIG. 9, as described above, the characteristic-value calculating section 242 shown in FIG. 8 adds, for example, these values to calculate an estimated value of an acquisition time $T^{http}$ which is needed for the client C to acquire from the server W the contents indicated by the URL specified by the environment parameter, and output it (Step 313). Further, the characteristic-value calculating section 242 may divide the size Sc of the aforementioned contents by the estimated value of the acquisition time $T^{http}$, and output the value as an estimated value of throughput $Tp^{http}$.

As described above, it is possible to exchange the packets between the server W and the communication performance measuring equipment M with the same delay as that of the case when the packets are exchanged between the server W and the client C, by carrying out the following procedures every time the control packet or the data packet is received from the server W.

① The probe packet is transmitted to the branching node I and the access point A to collect information about the conditions of the paths from the communication performance measuring equipment M to the branching node I and the paths from the communication performance measuring equipment M to the access point A.

② Based on the collected information, a difference between the time necessary to exchange each packet and its acknowledge packet between the server W and the communication performance measuring equipment M and the time necessary to exchange the same between the server W and the client C is estimated.

③ The acknowledge packet is delayed by the estimated difference.

Namely, irrespective of the position of the communication performance measuring equipment M, it is possible to artificially reproduce the HTTP-based data communication between the server W and the client C concerning the delay of the paths between the server W and the client C. Therefore, according to the above-described communication performance measuring equipment, it is possible to accurately evaluate the time required for an arbitrary client to acquire the contents indicated by the URL which is arbitrarily specified from the server W, its throughput, and the like.

According to the communication performance measuring equipment of the present invention, it is possible to artificially reproduce the FTP-based data communication between the client C and the server W, and to evaluate the communication performance of the paths between the client C and the server W, similarly to the above.

When the environment parameter instructing acquiring at least one file according to the FTP, the sequence controlling section 222 instructs the connection supervising section 223 to acquire the specified file according to the FTP. In response to the instruction, the connection supervising section 223 controls the respective sections to carry out the respective procedures of the FTP-based data communication in Step 309 to Step 312, and the times required to carry out these procedures are respectively evaluated.

Figure 19:
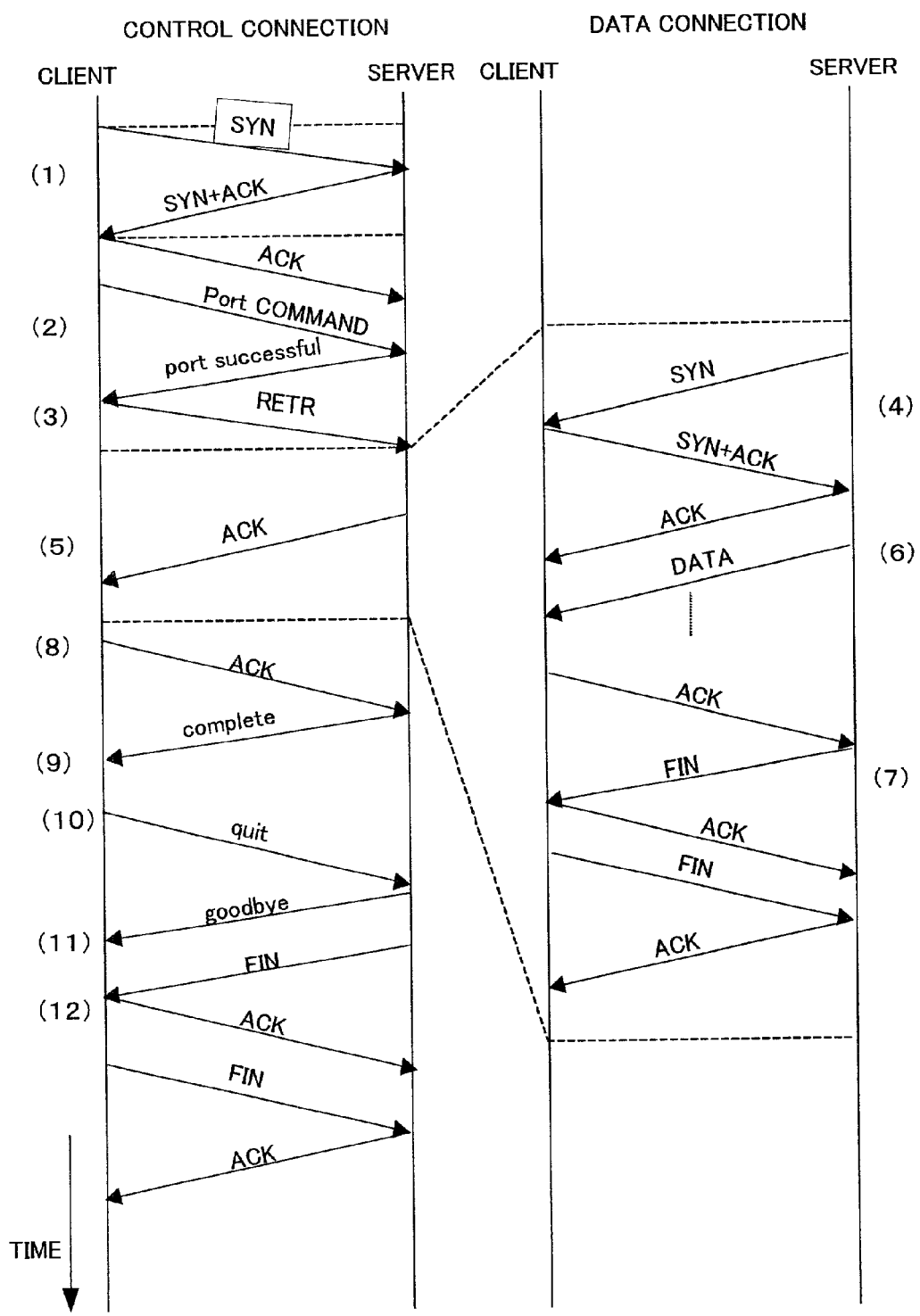
FIG. 19 is a sequence chart explaining FTP-based data communication.

FIG. 19 is a sequence chart explaining the FTP-based data communication.

First, in the Step 309 in FIG. 9, the procedure for establishing control connection between the client C and the server W is carried out by performing the sequence indicated by "(1)" in FIG. 19, and the time required to complete the sequence, that is, a control connection establishing time Tf1 is evaluated. As is clear from FIG. 19, this sequence of establishing the control connection is the same as the sequence of establishing the connection according to the HTTP, therefore, it is only required to evaluate the control connection establishing time Tf1 similarly to the processing of obtaining the connection establishing time Tc in the Step 306.

Next, in the Step 310, the procedure for transmitting a port command by the client C to the procedure for establishing connection of data connection are carried out by performing the sequence indicated by "(2)" to "(4)" in FIG. 19, and the time required to complete the sequence, that is, a data connection establishing time Tf2 is evaluated.

The data connection establishing time Tf2 is the sum of duration factors Tf2a, Tf2b and Tf2c which are required to carry out respective stages of the sequence indicated by "(2)" to "(4)" in FIG. 19, and the duration factors Tf2a, Tf2b and Tf2c can be expressed as Expressions 23, 24 and 25, respectively, by using data lengths $S^{port}$, $S^{reter}$ and $S^{succ}$ of the respective packets which are sent/received by the aforementioned sequence.

$$Tf2a = D(s^{port}, L(CA)) + D(s^{port}, L(AI)) + \\ D(s^{port}, L(IW)) + D(s^{succ}, L(WI)) + \\ D(s^{succ}, L(IA)) + D(s^{succ}, L(AC)) \quad (23)$$

$$Tf2b = D(s^{RETR}, L(CA)) + D(s^{RETR}, L(AI)) + \\ D(s^{RETR}, L(IW)) + D(s^{SYN}, L(WI)) + \\ D(s^{SYN}, L(IA)) + D(s^{SYN}, L(AC)) \quad (24)$$

$$Tf2c = D(s^{SYN+ACK}, L(CA)) + D(s^{SYN+ACK}, L(AI)) + \\ D(s^{SYN+ACK}, L(IW)) + D(s^{ACK}, L(WI)) + \\ D(s^{ACK}, L(IA)) + D(s^{ACK}, L(AC)) \quad (25)$$

In order to find the duration factor Tf2a corresponding to the stage indicated by "(2)" in FIG. 19, the connection controlling section 211 shown in FIG. 8 transmits the port command for notifying the server W of a port number for the data connection, and the sequence monitoring section 241 records the time at the instance as a reference time T0. Thereafter, when detecting a port successful packet being returned from the server W as a response, the sequence monitoring section 241 calculates a difference between the reference time T0 and the present time T1, and delivers the obtained value to the delay model applying section 224 as a measured value of a duration factor $Tf2a^{MW}$ which is necessary to carry out the stage between the server W and the communication performance measuring equipment M.

Here, in response to the instruction from the probe controlling section 225 shown in FIG. 8, the probe packet sending/receiving section 231 transmits the probe packets to the branching node I and the access point A, and the time counter 232 measures round trip times RTTa and RTTb of the probe packets, respectively.

The delay model applying part 224 estimates the duration factor Tf2a between the server W and the client C, based on the measured round trip times RTTa and RTTb, and the measured value of the duration factor $Tf2a^{MW}$.

Here, the duration factor $Tf2a^{MW}$ between the server W and the communication performance measuring equipment M can be expressed as Expression 26, by using the data lengths $S^{port}$ and $S^{succ}$ of the respective packets which are sent/received in the stage and the coefficients of the respective router models which exist in the paths between the server W and the communication performance measuring equipment M, and further, the round trip times RTTa and RTTb can be expressed as the Expression 8 and the Expression 9, respectively.

$$Tf2a^{MW} = D(s^{port}, L(MI)) + D(s^{port}, L(IW)) + \\ D(s^{succ}, L(WI)) + D(s^{succ}, L(IM)) \quad (26)$$

When the Expression 23 is rewritten by using these Expressions, the duration factor Tf2a which is required to carry out the stage (2) between the server W and the client C can be expressed as Expression 27, by using the measured value of the duration factor $Tf2a^{MW}$, the round trip times RTTa and RTTb, the data lengths of the respective packets and the respective coefficients of the router models which exist between the server W and the client C.

$$Tf2a = RTTb - 2RTTa + Tf2a^{MW} + d(L(CA)) + \quad (27)$$
$$d(L(AC)) + q(L(CA)) + q(L(AC)) +$$
$$\frac{S^{port}}{b(L(CA))} + \frac{S^{succ}}{b(L(AC))} +$$
$$(S^{port} - S^{ping})\left(\frac{1}{b(L(AI))} - \frac{1}{b(L(MI))}\right) +$$
$$(S^{succ} - S^{ping})\left(\frac{1}{b(L(IA))} - \frac{1}{b(L(IM))}\right)$$

The delay model applying section 224 estimates the duration factor Tf2a by using this Expression 27, and delivers the value to the performance evaluating section 240 and the connection supervising section 223 shown in FIG. 8.

Correspondingly, the connection supervising section 223 instructs the connection controlling section 211 to transmit an RETR command in order to start the evaluation of the duration factor Tf2b corresponding to the stage indicated by "(3)" in FIG. 19, after the duration factor Tf2a has passed from the time at which the port command is transmitted.

In response to the instruction, the connection controlling section 211 transmits the RETR command to make a request to the server W for the contents. At this time, the connection supervising section 223 records the present time as a reference time T0. Thereafter, similarly to the evaluating processing of the duration factor Tf2a, when receiving the SYN packet from the server W, the connection supervising section 223 calculates a difference between the reference time T0 and the present time T1 at the instance, and delivers the obtained value to the delay model applying section 224 as a measured value of a duration factor Tf2b$^{MW}$. Simultaneously, the probe controlling section 225 and the probe packet sending/receiving section 231 carry out processing of investigating the conditions of the paths using the probe packet, and the time counter 232 measures the round trip times RTTa and RTTb.

Moreover, similarly to the technique described in the evaluating processing of the duration factor Tf2a, it is possible to derive Expression 28, in which the duration factor Tf2b is expressed by using the data lengths S$^{RETR}$ and S$^{SYN}$ of the packets sent/received in the stage indicated by "(3)" in FIG. 19.

$$Tf2b = RTTb - 2RTTa + Tf2b^{MW} + d(L(CA)) + \quad (28)$$
$$d(L(AC)) + q(L(CA)) + q(L(AC)) +$$
$$\frac{S^{RETR}}{b(L(CA))} + \frac{S^{SYN}}{b(L(AC))} +$$
$$(S^{RETR} - S^{ping})\left(\frac{1}{b(L(AI))} - \frac{1}{b(L(MI))}\right) +$$
$$(S^{SYN} - S^{ping})\left(\frac{1}{b(L(IA))} - \frac{1}{b(L(IM))}\right)$$

Therefore, the duration factor Tf2b can be estimated in the delay model applying section 224 by assigning appropriate values to the Expression 28 to, and delivers the value to the performance evaluating section 240 and to the connection supervising section 223 shown in FIG. 8.

Correspondingly, the connection supervising section 223 starts the evaluation of the duration factor Tf2c corresponding to the stage indicated by "(4)" in FIG. 19, after the duration factor Tf2b has passed from the time at which the RETR command is transmitted.

In this case, the connection supervising section 223 instructs the connection controlling section 211 to transmit the SYN+ACK packet as a response to the SYN packet.

In response to the instruction, the connection controlling section 211 transmits the SYN+ACK packet to the server W. Further, at this time, the connection supervising section 223 records the present time as a reference time T0. Thereafter, similarly to the evaluating processing of the duration factor Tf2a, when receiving the ACK packet from the server W, the connection supervising section 223 calculates a difference between the reference time T0 and the present time T1, and delivers the obtained value to the delay model applying section 224 as a measured value of a duration factor Tf2cMW. Simultaneously, the probe controlling section 225 and the probe packet sending/receiving section 231 carry out the processing of investigating the conditions of the paths with use of the probe packet, and the time counter 232 measures the round trip times RTTa and RTTb.

Moreover, similarly to the technique described in the evaluating processing of the duration factor Tf2a, it is possible to derive Expression 29, in which the duration factor Tf2c is expressed by using data lengths S$^{SYN+ACK}$ and S$^{ACK}$ of the packets sent/received in the stage indicated by "(4)" in FIG. 19 and the data length S$^{ping}$ of the probe packet.

$$Tf2c = RTTb - 2RTTa + Tf2c^{MW} + d(L(CA)) + \quad (29)$$
$$d(L(AC)) + q(L(CA)) + q(L(AC)) +$$
$$\frac{S^{SYN+ACK}}{b(L(CA))} + \frac{S^{ACK}}{b(L(AC))} +$$
$$(S^{SYN+ACK} - S^{ping})\left(\frac{1}{b(L(AI))} - \frac{1}{b(L(MI))}\right) +$$
$$(S^{ACK} - S^{ping})\left(\frac{1}{b(L(IA))} - \frac{1}{b(L(IM))}\right)$$

Therefore, the duration factor Tf2c can be estimated in the delay model applying section 224 by assigning appropriate values to the Expression 29 to, and delivers the value to the performance evaluating section 240.

The performance evaluating section 240 calculates the sum of the duration factors Tf2a, Tf2b and Tf2c, and sets the value as the data connection establishing time Tf2.

Next, in the Step 311 in FIG. 9, the procedures for returning the ACK packet by the server W, carrying out the data communication by the data connection, and completing the data communication to release the data connection are carried out by performing the sequences indicated by "(5)", "(6)" and "(7)" in FIG. 19, and the time required for completion of the sequences, that is, a total communication time Tf3 is evaluated.

It should be noted that the procedure for exchanging the data packets and the acknowledge packets in the data connection after the ACK packet is received from the server W as indicated by "(5)" in FIG. 19 and the procedure for releasing the data connection are the same as the data communicating procedure and the connection releasing procedure which are included in the data communication according to the HTTP communication shown in FIG. 13.

Therefore, in receiving the ACK packet, the measurement controlling section 220 records the present time as a reference time T0, and thereafter, controls the operations of the 110 communicating section 210 and the measurement executing section 230, similarly to the evaluating processing of the file download time by the HTTP shown in FIG. 15 and the evaluating processing of the connection releasing time shown in FIG. 18, thereby acquiring the download time Td and the connection releasing time Tr. It should be mentioned that, as is clear from the explanation of the Step 340 shown in FIG. 15, the download time Td is obtained as an elapsed time from the reference time T0 to the time T1 of receipt of the FIN packet signifying the completion of the data communication, that is, as a difference (T1−T0) between the time T1 and the reference time T0. Therefore, the sequence monitoring section 241 can obtain the difference (T1−T0) by monitoring the operation of the communicating section 210, and in the meantime, the delay model applying part 224 can obtain the estimated value of the connection releasing time Tr by executing the estimating processing. Thus, the performance evaluating section 240 may obtain the total communication time Tf3 by adding these values.

Next, in Step 312 shown in FIG. 9, the procedures for returning the ACK packet which notifies that the data connection is released from the client C to the server W, through exchanging a predetermined message signifying the transfer completion (indicated by "complete" in FIG. 19), a quit command for log-off, a goodbye message and the like, and final release of the control connection are carried out by executing the sequences indicated by "(8)" to "(12)" in FIG. 19, and the time required for completion of the sequence, that is, a control connection releasing time Tf4 is evaluated.

When the data transfer is carried out between the client C and the server W by the FTP through an Internet browser, the transfer of the data is already completed at the time of release of the data connection in the stage indicated by "(7)" in FIG. 19. Therefore, it appears for a user of the client C that data transfer processing by the FTP completes simultaneously with the release of the data connection, and the user does not recognize the delay time required to send/receive the packets which are exchanged in the sequence indicated by "(8)" to "(12)" in FIG. 19.

Since the user does not recognize the control connection releasing time Tf4 concerning the FTP, the value may be set at a numeric value "0". It is possible to express the control connection releasing time Tf4 by using the delay model when the aforementioned technique is applied so that it is naturally possible to evaluate the value if necessary.

As described above, after evaluating the control connection establishing time Tf1, the data connection establishing time Tf2, the total communication time Tf3 and the control connection releasing time Tf4, the characteristic-value calculating section 242 shown in FIG. 8 finds the sum of these values in the Step 313 shown in FIG. 9, and outputs the value as an estimated value of an acquisition time $T^{ftp}$ which is required to acquire the file according to the FTP. Further, it may divide the size Sf of the file by the estimated value of the acquisition time $T^{ftp}$, and may output the value as throughput $Tp^{ftp}$ of the data transfer by the FTP.

In the HTTP-based data communication and the FTP-based data communication, when inputting the environment parameters representing a plurality of files, processing of acquiring the specified plurality of the files in parallel is carried out in the processing of evaluating the times for carrying out the procedures. In this condition the acquisition times required to acquire the respective files and the time required to acquire all of the specified files can be evaluated.

It is naturally possible to evaluate the time required to acquire each of components constituting an Web page, such as text and images, by inputting environment parameters specifying each file included in the contents designated by URL.

Moreover, it is possible to simulate the data transfer between the server W and the client C with limitation of the size of the queue provided in the client C taken into consideration, the limitation causes discard of the data packet reaching the client C.

Figure 20:
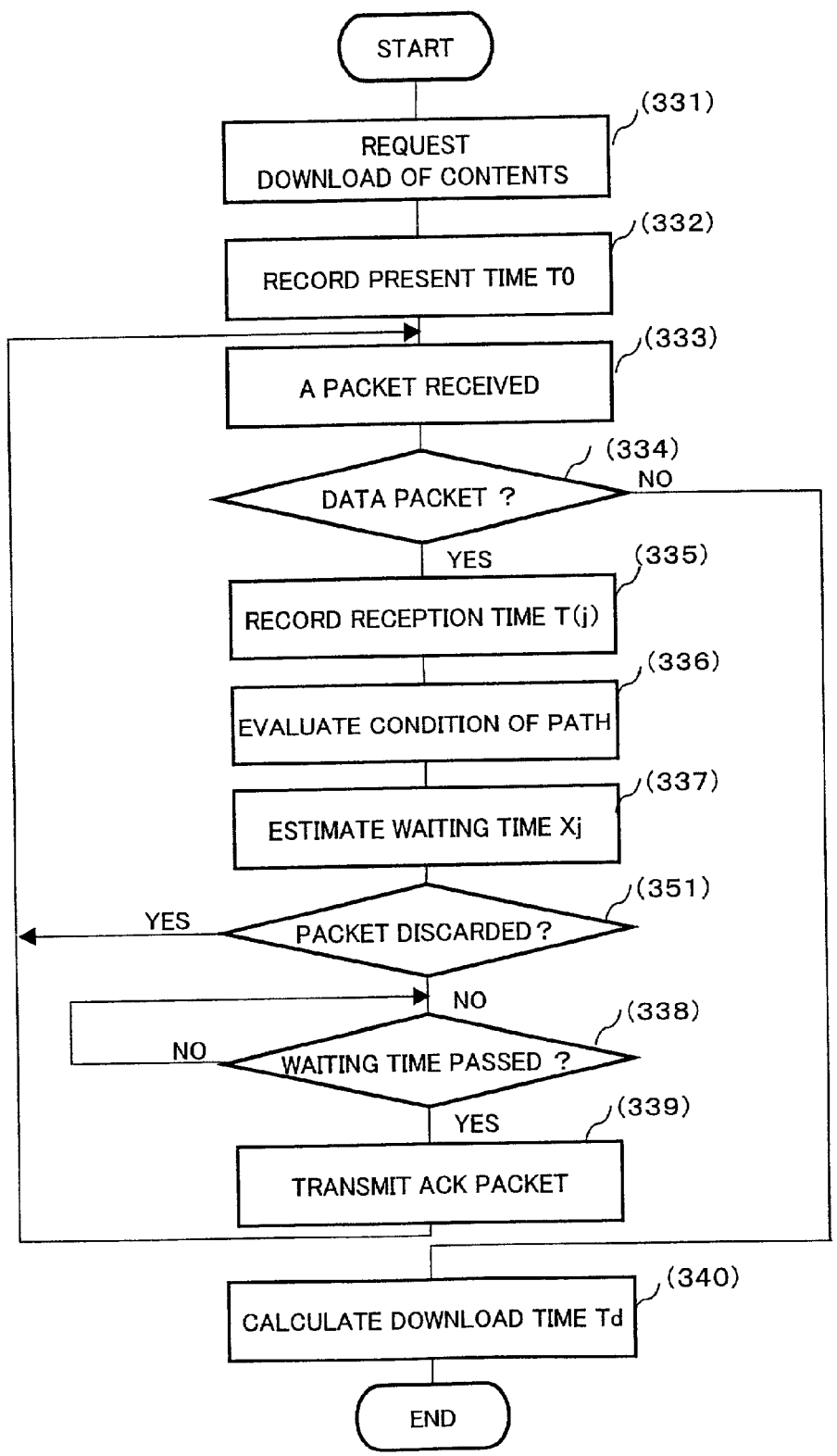
FIG. 20 is a flowchart showing the operation of evaluating the download time, and FIGS. 21(a) and (b) are structural examples of a conventional communication performance measuring system.
Figure 21:
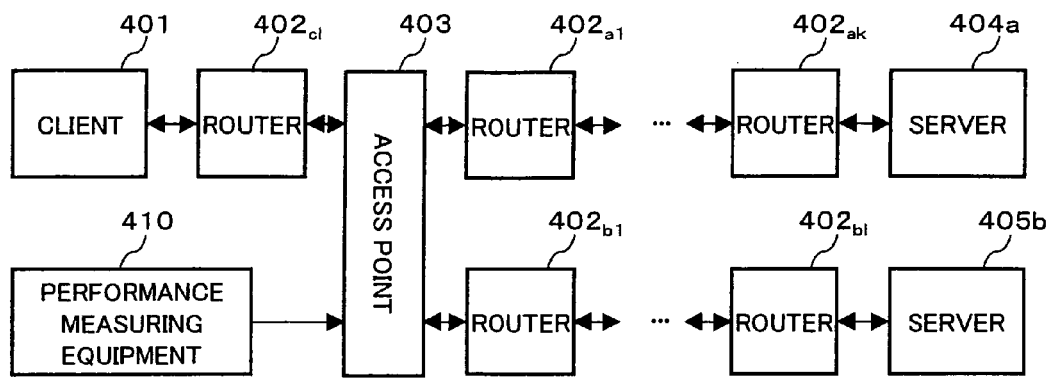
Figure 21:
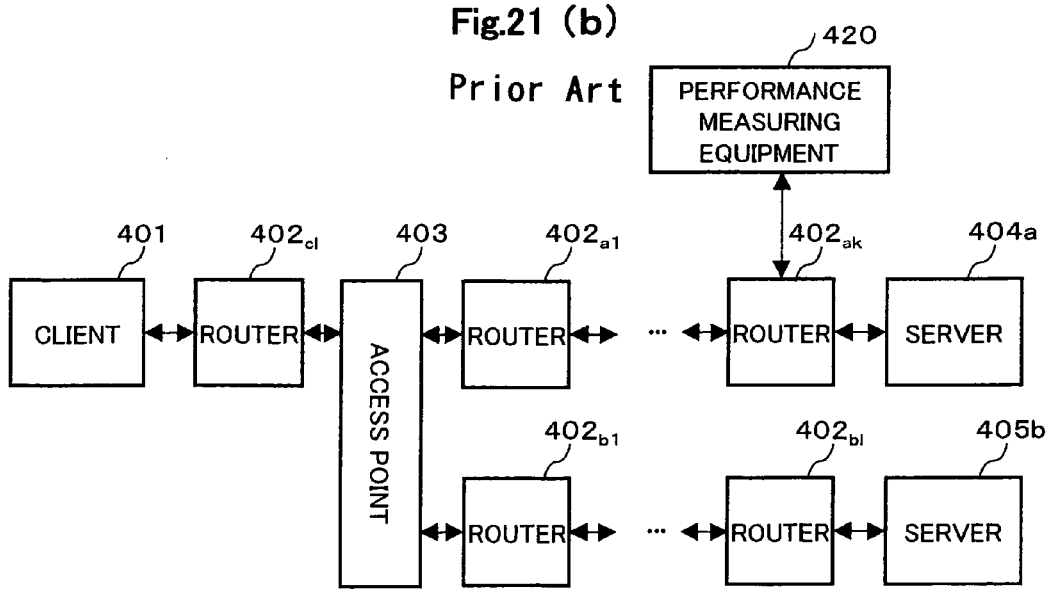

FIG. 20 is a flowchart showing the evaluating operation of the download time.

The flowchart shown in FIG. 20 includes processing of determining whether the jth data packet is discarded or not, based on the result of comparison between the queuing delay $q^{bottle}(j)$ which is calculated in the process of estimating the difference Xj of the delay times (refer to the Expression 18) and a predetermined threshold Qmax (Step 351), after the Step 337 in the flowchart shown in FIG. 15.

It should be mentioned that, the data packet is discarded when the queuing delay $q^{bottle}(j)$ exceeds the threshold Qmax which is expressed by Expression 30 by using the queue size Nb of the client C, MTU (Maximum Transmission Unit) of the client C, and the transmission rate b(L (AC)) of the router model of the path from the access point A to the client C, when the jth data packet reaches the queue of the client C.

$$Q\max = Nb \times MTU / b(L(AC)) \tag{30}$$

Therefore, the delay model applying section 224 compares the queuing delay $q^{bottle}(j)$ which is obtained in the processing of the Step 337 with the aforementioned threshold Qmax, and, when the queuing delay $q^{bottle}(j)$ exceeds the threshold Qmax, instructs the reply controlling section 226 not to transmit the ACK packet, as positive judgment of the Step 351, and it returns to the Step 333. When the Step 351 is judged negative, it proceeds to the step 338 and waits for the completion of the waiting time Xj.

Thus, the data transfer between the server W and the client C can be simulated with assumption for the case in which the data packet reaching the client C is discarded.

The invention is not limited to the above embodiments and various modifications may be made without departing from the spirit and the scope of the invention. Any improvement may be made in part or all of the components.

What is claimed is:

1. Communication performance measuring equipment measuring communication performance of a communication system in which at least one client and at least one server are connected via a network including a plurality of routers, in which the communication performance measuring equipment is communicable with a client subject to evaluation, included in said at least one client, and a server subject to evaluation, included in said at least one server, the communication being through a path branching from a path in a branching node which exists on the path between said client and said server subject to evaluation, the communication performance measuring equipment comprising:

a communicating unit communicating via the network according to TCP/IP;

an input unit receiving a parameter which includes at least a server identifier identifying said server subject to evaluation and a client identifier identifying said client subject to evaluation or an access point to be used by said client and represents a communication environment to be evaluated;

a communication controlling unit controlling communication operation of said communicating unit according to a predetermined procedure, the communication operation being performed for acquiring a predetermined file from a server;

a packet transmitting/receiving unit transmitting/receiving a predetermined control packet to/from a destination identified by an identifier which is specified according to an inputted transmission instruction;

a situation inspecting unit collecting information about transmitting/receiving conditions of said predetermined control packet transmitted to each destination and of a predetermined control packet returning from each destination in response to the transmitted control packet;

a primary transmission instructing unit inputting, to said packet sending/receiving unit, a transmission instruction to specify the client identifier and an identifier identifying a branching node as destinations, according to receiving conditions of a data packet or a control packet in said communicating unit;

a delay estimating unit estimating a difference between a delay time in transmitting a data packet from said server subject to evaluation to said client subject to evaluation, based on a predetermined delay model and said information collected by the situation inspecting unit in a course of exchanging said predetermined control packet with the client subject to evaluation and with the branching node, and a delay time in the data packet reaching said communication performance measuring equipment from the server subject to evaluation;

a reply controlling unit emulating an acknowledgement from said client subject to evaluation, by adjusting a time instant at which said communicating unit is to transmit an acknowledge packet upon receiving a data packet or a control packet from the server subject to evaluation, according to the estimated difference delay times; and a performance estimating unit collecting information about progress in the communication with said subject to evaluation by said communicating unit, and estimating communication performance on a communication path between the client and the server based on the collected information.

2. The communication performance measuring equipment according to claim 1, wherein:

said situation inspecting unit comprises:

a transmission detecting unit recording, for every destination as a transmission time, a time instant at which transmission of said predetermined control packet is detected, the transmission being performed by said packet sending/receiving unit to each destination, a reception detecting unit detecting reception of a control packet by said packet sending/receiving unit, the control packet returning from each destination as a response to said predetermined control packet transmitted to each destination, and recording, for every destination as a reception time, a time instant at which the reception is detected, and a time informing unit informing said delay estimating unit of the transmission time and the reception time of each destination; and said delay estimating unit comprises:

a round-trip time calculating unit calculating a first round trip time and a second round trip time, based on the transmission time and the reception time informed by the time informing unit, the first round trip time being required for said predetermined control packet to reciprocate between the client and the communication performance measuring equipment, and the second round trip time being required for said predetermined control packet to reciprocate between the branching node and the communication performance measuring equipment, and a difference estimating unit for estimating, based on the first round trip time, the second round trip time, and the delay model, a difference between a time required to deliver the data packet or a control packet from the server to the communication performance measuring equipment, and a time required to deliver the data packet or the control packet from the server to the client.

3. The communication performance measuring equipment according to claim 1, wherein said input unit comprises:

a path information collecting unit collecting first path information consisting of identifiers identifying respective nodes existing on the path from the communication performance measuring equipment to the client, and second path information consisting of identifiers identifying respective nodes existing on the path from the communication performance measuring equipment to the server; and a branch detecting unit for detecting an identifier for identifying a branching node by comparing the first path information with the second path information, and for inputting the identifier as a part of the parameter.

4. The communication performance measuring equipment according to claim 1, wherein said input unit comprises:

a secondary transmission instructing unit giving an instruction to said packet sending/receiving unit to transmit, to the client, two control packets having a predetermined form and different data lengths from each other;

a round-trip time measuring unit measuring a round trip time of each of the two control packets, the round trip time being a time taken from transmission of the control packet to reception of an acknowledge packet in response to the transmitted control packet; and a coefficient estimating unit estimating a coefficient associated with a factor which varies depending on the size of a packet to be transmitted, in a predetermined delay model representing data transmission between a branching node and the client, and inputting the estimated coefficient as a part of the parameter, based on the obtained round tip time of each of the two control packets.

5. The communication performance measuring equipment according to claim 2, wherein said delay estimating unit comprises:

an offset calculating unit calculating, based on a predetermined model, a factor of a delay time due to accumulation of data packets when the data packets are transmitted from the server to the client in a burst mode, and outputting the resultant as an offset corresponding to the difference obtained by the difference estimating unit; and a difference output unit adding the offset to the value estimated by the difference estimating unit, and outputting the resultant as an estimated value.

6. The communication performance measuring equipment according to claim 5, wherein said delay estimating unit further comprises a stop decision unit comparing the calculated offset with a predetermined threshold, and instructing said reply controlling unit to stop the transmission of the acknowledge packet, according to the comparison result.

7. The communication performance measuring equipment according to claim 1, wherein said performance estimating unit comprises:
- a first recording unit monitoring transmitting/receiving operation of a control packet and a data packet performed by said communicating unit, and recording start time and finish time of each of procedures which are defined in HTTP; and
- a duration calculating unit calculating a difference between the start time and the finish time as a duration for each procedure, and calculating a sum of the duration of the procedures.

8. The communication performance measuring equipment according to claim 1, wherein said performance estimating unit comprises:
- a second recording unit monitoring transmitting/receiving operation of a control packet and a data packet performed by said communicating unit, and recording start time and finish time of each of procedures which are defined in FTP; and
- a duration calculating unit calculating a difference between the start time and the finish time as duration for each procedure and calculating a sum of the durations of the procedures.

* * * * *

UNITED STATES PATENT AND TRADEMARK OFFICE
CERTIFICATE OF CORRECTION

PATENT NO. : 7,120,125 B2 Page 1 of 1
APPLICATION NO. : 10/025861
DATED : October 10, 2006
INVENTOR(S) : Shinji Kikuchi et al.

It is certified that error appears in the above-identified patent and that said Letters Patent is hereby corrected as shown below:

Column 30, Line 66, after "client" insert --,--.

Column 32, Line 49, change "tip" to --trip--.

Signed and Sealed this

Sixth Day of March, 2007

JON W. DUDAS
*Director of the United States Patent and Trademark Office*